INVENTOR:
ROLF BERGKVIST

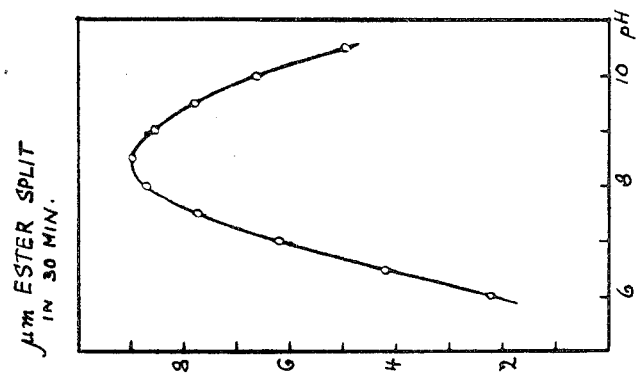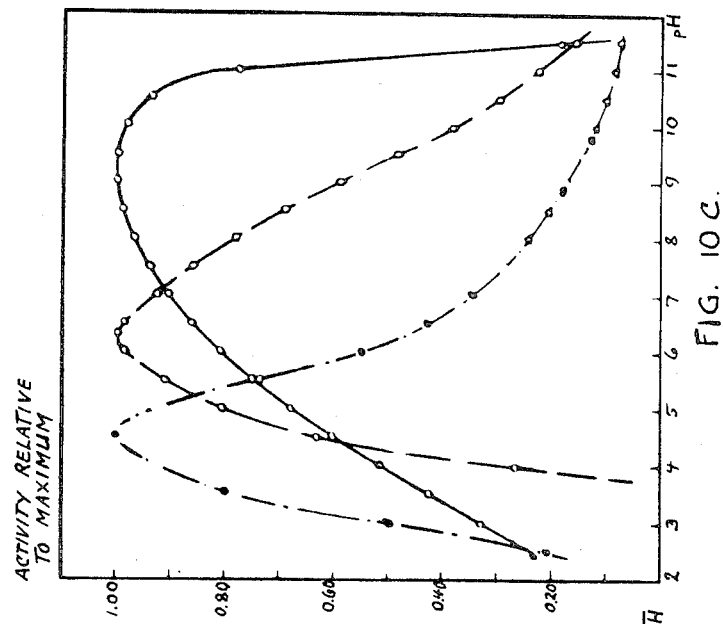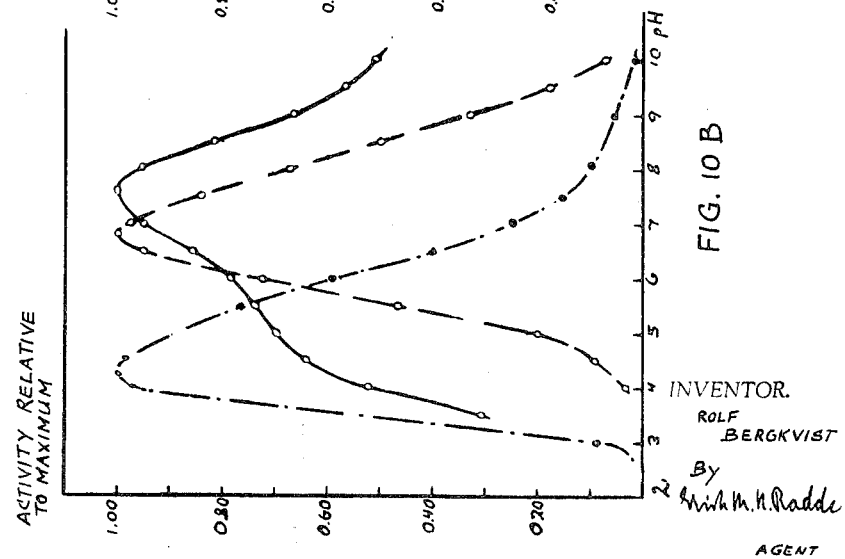

INVENTOR.
ROLF BERGKVIST
BY
AGENT

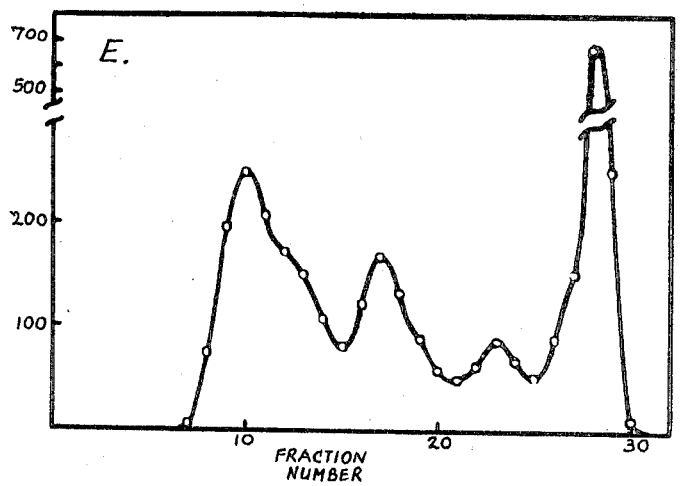
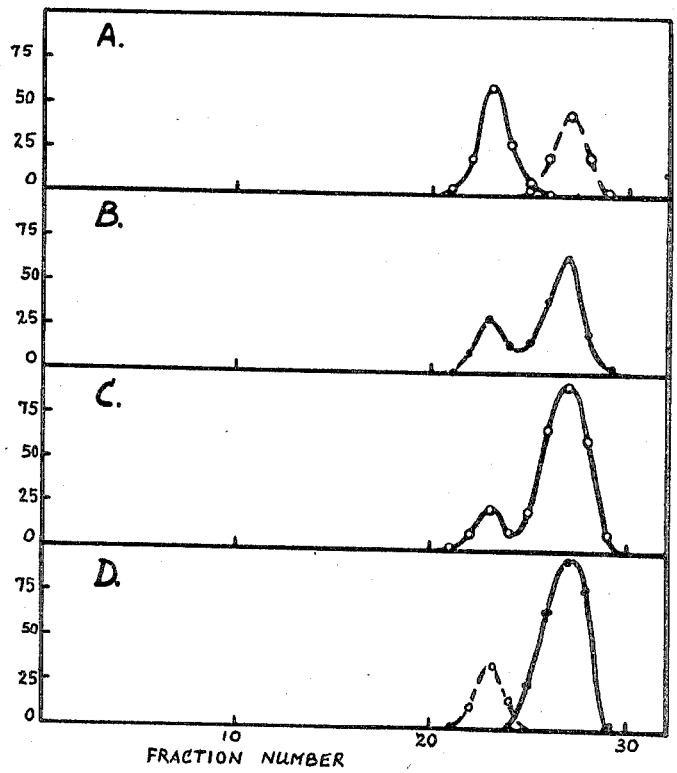
FIG. 27
INVENTOR.
ROLF BERGKVIST

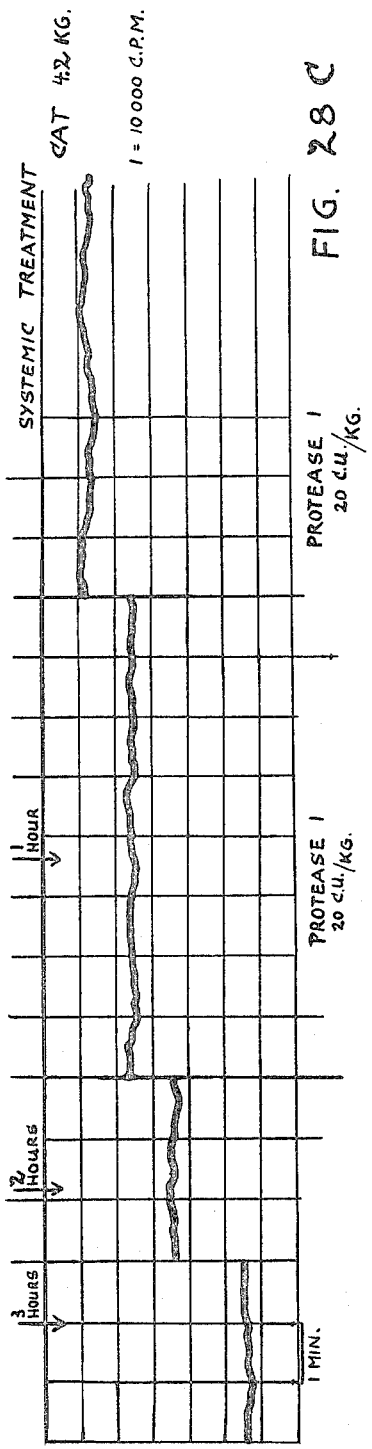
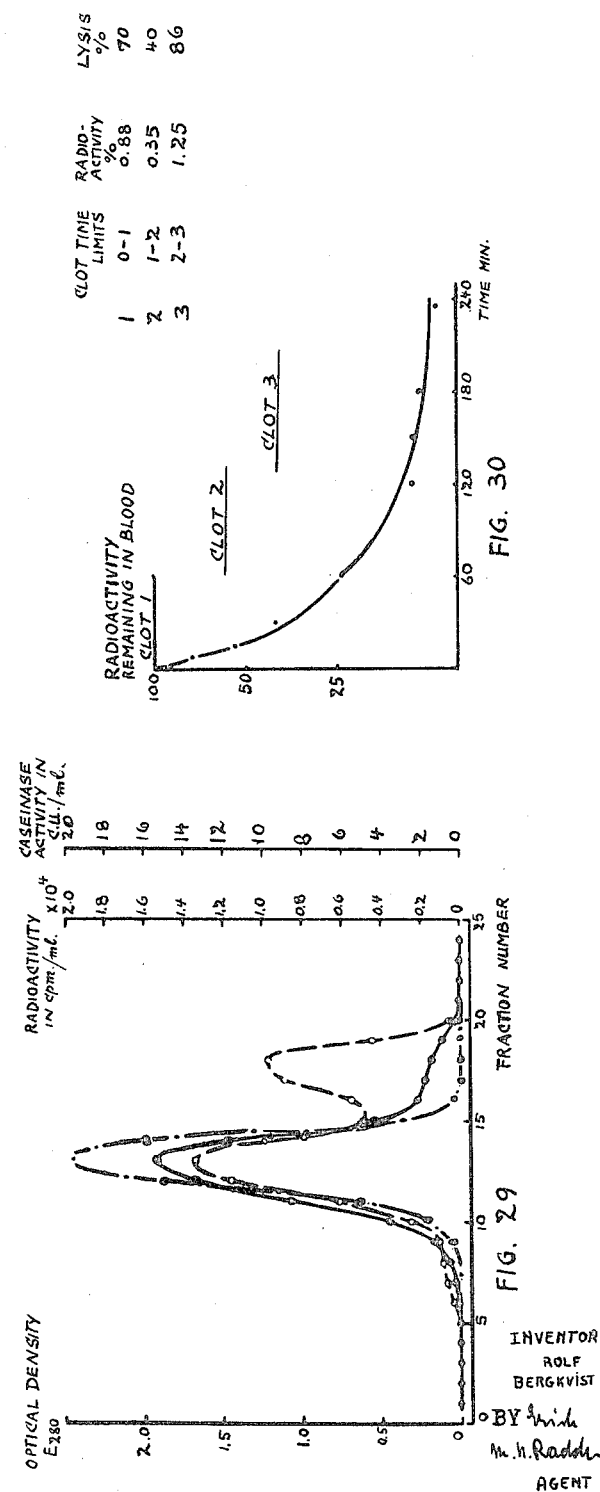

3,281,331
PROCESS OF ISOLATING AND SEPARATING PROTEOLYTIC ENZYMES
Rolf Bergkvist, Soedertaelje, Sweden, assignor to Aktiebolaget Astra, Apotekarnes Kemiska Fabriker, Sodertalje, Sweden, a Swedish corporation
Filed Oct. 19, 1962, Ser. No. 231,867
Claims priority, application Sweden, Nov. 8, 1961, 11,134/61
19 Claims. (Cl. 195—66)

The present application is a continuation in part of copending application Serial No. 166,168, filed January 15, 1962 and entitled "Proteolytic Enzymes and Process of Making and Using Same," now abandoned.

The present invention relates to the preparation, isolation, and separation of new and valuable proteolytic enzymes and more particularly of proteolytic enzymes derived from molds, and to the enzymes thus obtained.

This invention also relates to the manufacture of preparations containing such enzymes and the use thereof in therapy for the treatment of wounds, for debriding third degree burns, for the dissolution of clots and occlusions formed by components of the blood in veins and arteries, and as anti-inflammatory agents.

It has been known for many years that most molds produce appreciable amounts of proteolytic enzymes. Considerable attention has been paid to this field during the last ten years and many valuable results have been presented but, with few exceptions, these enzymes have not been purified and studied extensively.

Mold protease, as it has been produced heretofore, is not a single enzyme but consists of a system of protolytic enzymes. Thus, such simple terms as *Aspergillus oryzae* protease or Rhizopus protease have caused much confusion. Therefore, a satisfactory classification of mold proteases is required. Our knowledge of the complicated mixture of proteolytic enzymes secreted by different molds is still very limited. They have been classified according to their pH-activity with regard to casein digestion.

A wide range of pH optima has been reported for mold proteases depending on the substrate and the organism used. Most scientists have accepted the evidence that there are three types of protein hydrolyzing enzymes namely those which exhibit optimum activity at acid pH, those which exhibit optimum activity at neutral pH, and those which exhibit optimum activity at alkaline pH.

An acid protease is a major component of the proteases of various black Aspergilli such as *Asp. niger*, *Asp. awamori*, and *Asp. saitoi*. *Aspergillus oryzae* grown in a carbohydrate-rich medium, which results in a lower pH, is said to produce also mainly this acid type of enzyme. However, when growing said mold on a protein-rich culture medium, only small amounts of such an enzyme are formed.

A neutral protease has been separated from Takadiastase, a commercial enzyme preparation from *Asp. oryzae*, and a similar enzyme has been isolated from *Asp. sojae*.

Rhizopus and Penicillium have been reported to produce an acid protease in abundant amounts, along with other types of proteases.

An alkaline protease is said to be the main protease produced in *Asp. oryzae* cultures, and many other Aspergilli and some Penicillia also produce this type of enzyme.

However, classification and characterization of the different proteolytic enzymes based on the range of pH-value, at which optimum enzyme activity is exhibited has proved to be unsatisfactory. Enzymes of different origin may have the same activity on a simple substrate but they may be essentially different in nature. Therefore, some scientists have tried to classify the proteolytic enzymes by studying their behavior towards a number of proteolytic inhibitors. In this way it was thought that it might be possible to differentiate between proteolytic enzymes with identical action on simple substrates. This interaction permits a more detailed classification of the proteolytic enzymes, and by this method it has been possible to show the complexity of enzyme preparations which were previously assumed to be pure.

Since our knowledge of the specificity of the proteases in far from complete, other means of classifying these enzymes have also been suggested. However, all such suggestions are subject to some criticism. Although the proteolytic enzymes have been the subject of many investigations since 1932, most of the available data on these enzyme systems have been obtained with crude, non-fractionated, and partly inactivated preparations. Relatively few attempts have been made to determine absolute and relative amounts of the individual enzymes.

As stated above, the proteolytic enzymes of molds appear to be quite numerous. Yet our information concerning them is very meager as compared to our present knowledge of corresponding animal enzymes. It has, however, become evident that the enzyme content varies as much between molds of the same genus as between molds of different genera. The medium upon which the mold is grown and the period of cultivation have an important effect upon the kind and amount of enzyme formed.

The relatively unexplored study of mold proteases appears to be closely concerned with the great difficulties in the isolation and fractionation of the different enzymes. A number of methods have been suggested for the separation of proteases, but most of these have a number of disadvantages. Purification of the enzymes involves very delicate and intricate problems. Some of the proteolytic enzymes are unstable and easily lose their activity; consequently their purification must be carried out with great care under specific conditions. In addition each enzyme is stable only under specific conditions which differ from enzyme to enzyme. Thus each enzyme requires specific procedures for a satisfactory purification with a good yield. The conventional purifying methods, however, usually cause impurities to accumulate together with the protease. In order to obtain a satisfactory purification effect, purification must be carried out under strict conditions. As a result thereof the yield of the different proteases is considerably reduced.

It is one object of the present invention to provide a simple and effective method of isolating and purifying proteases produced microbiologically.

Another object of the present invention is to provide simple and effective methods of separating and purifying proteolytic enzymes without any appreciable loss in substance and activity.

A further object of the present invention is to provide compositions useful in the treatment of infected, badly or wrongly healing wounds, burns, inflammations, or blood clots and occlusions in veins and arteries, for instance, of the brain and the heart.

Another object of the present invention is to provide a composition for dissolving and removing accretions and obstructions in the vascular system which are caused by precipitation of substances of proteinaceous or other origin.

Still another object of the present invention is to provide a composition for the removal of necrotic tissue, such as for debriding burns and other wounds.

A further object of the present invention is to provide an anti-inflammatory composition useful in the treatment of inflammations.

Other objects of the present invention and advantageous features thereof will become apparent as the description proceeds.

In principle, the process of isolating and separating the mold proteases consists in contacting a solution of such proteases, preferably after preliminary purification, with an ion exchange agent selected from the group consisting of carboxy methyl polysaccharides such as carboxy methyl cellulose and a carboxy methyl cross-linked dextran sold under the trademark "CM-Sephadex" by the Swedish firm Pharmacia, at a pH between about 2.5 and about 8.5 and eluting the adsorbed proteases by contacting the ion exchange agent with an eluting solution buffered to a pH different from that at which the proteases were adsorbed.

According to a preferred embodiment of the present invention proteases obtained by cultivation of molds comprising species of the genera Aspergillus, Penicillium, and Rhizopus are used as starting material.

The protease-containing solution obtained on cultivation of the mold is preferably subjected to precipitation by means of tannin. The tannin is subsequently removed from the precipitate by extraction with a suitable solvent.

According to a preferred embodiment of the present invention with proteolytic enzymes, the properties of which will be described subsequently in detail and which will be designated hereinafter in the specification and claims as protease I, protease II, and protease III, respectively, are obtained by submerged cultivation of *Aspergillus oryzae* until the onset of sporulation, filtration of the culture liquid, and precipitation of the proteins including the proteases by the addition of tannin. The tannin is removed by dissolving it out of the precipitate by a treatment with acetone. The remaining residue is dissolved in water and the pH-value of the resulting solution is adjusted to a pH of about 5.5. The resulting protease-containing solution is then contacted with a cation exchanging carboxy methyl cellulose which previously had been adjusted to a pH of about 5.5.

Preliminary adjustment of the carboxy methyl cellulose was carried out by suspending the carboxy methyl cellulose in about ten times its volume of 0.5 molar phosphate buffer of the pH-value of 5.5, stirring the mixture for about one hour, allowing the treated carboxy methyl cellulose to settle for half an hour, and decanting the supernatant liquid with very small particles suspended therein. The adsorbent was then washed several times on the Buechner funnel with 0.01 molar phosphate buffer of the same pH-value of about 5.5 Thereafter, the washed carboxy methyl cellulose was resuspended in the same buffer solution and allowed to stand therein over night whereafter the treated carboxy methyl cellulose adjusted to the required pH of about 5.5 is separated from the buffer solution and is used for separating the proteases according to the present invention.

The carboxy methyl cellulose, together with the protease I, adsorbed thereon, is separated from the crude protease solution, which is then adjusted to a pH of 4.5 and contacted with carboxy methyl cellulose also adjusted to a pH of 4.5. The carboxy methyl cellulose, together with the protease II adsorbed thereon is separated from the solution, which is finally adjusted to a pH of 3.0 for the isolation of protease III and is contacted with carboxy methyl cellulose adjusted to the same pH-value of 3.0. The carboxy methyl cellulose, together with the adsorbed protease III, is also separated from the solution. Substantially pure proteases I, II, and III are eluted from the respective cation exchange agents by washing with buffer solutions, the pH-values of which are different from and preferably higher than those at which the respective proteases were adsorbed.

The present invention will further be explained by means of the attached drawings of which FIG. 1 is a flow sheet illustrating the process of selective adsorption on carboxy methyl cellulose and separation therefrom according to the present invention.

Figure 10A:
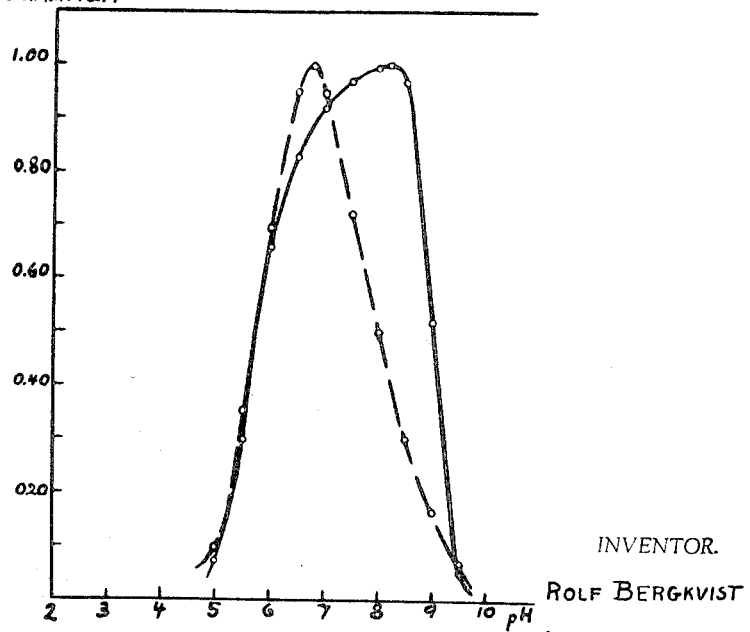

FIGS. 10A, 10B, and 10C illustrate the effect of the pH on the proteolytic activity of proteases I, II, and III. Thereby, FIG. 10A represents their caseinase activity, FIG. 10B their hemoglobinase activity, and FIG. 10C their gelatinase activity.

Figure 11A:
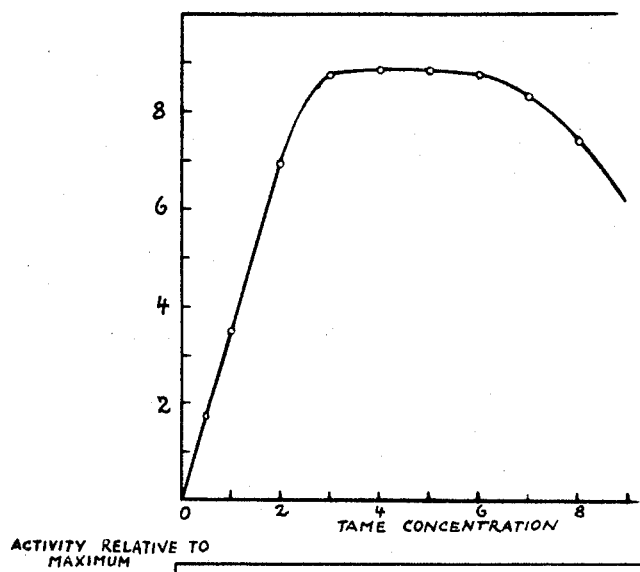

FIGS. 11A and 11B illustrate the hydrolytic effect of protease I on the synthetic substrate tosyl arginine methyl ester designated as TAME whereby FIG. 11A represents the substrate titration curve with protease I at the pH of 8.0, while FIG. 11B illustrates the effect of the pH-value on hydrolysis of TAME by protease I.

Figure 12:
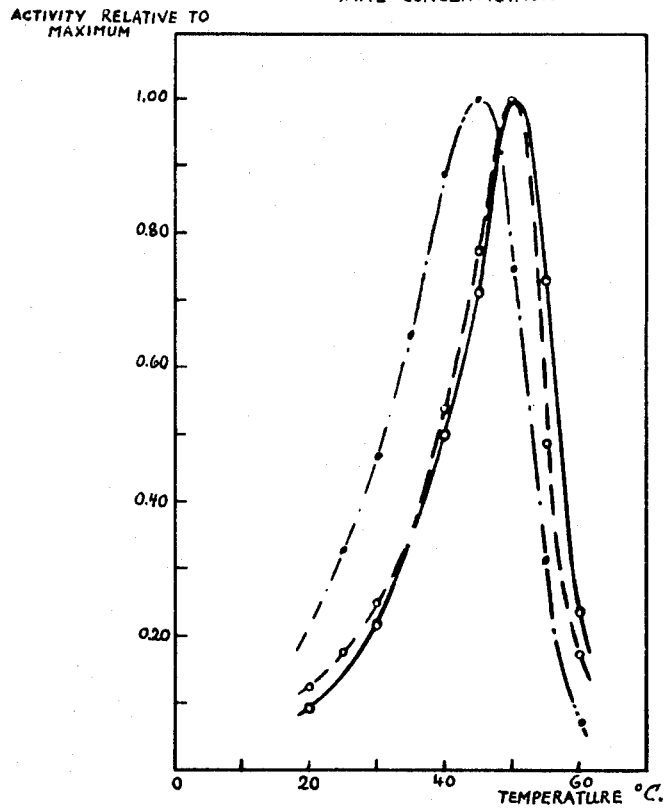

FIG. 12 shows the effect of the incubation temperature on the caseinase activity of proteases I, II, and III.

Figure 13:
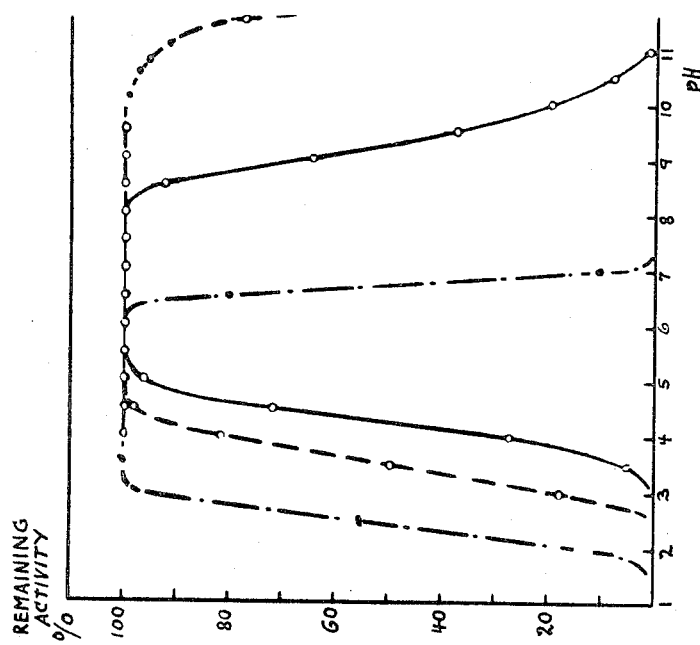

FIG. 13 illustrates the effect of the pH-value on the stability of the proteases.

Figure 14:
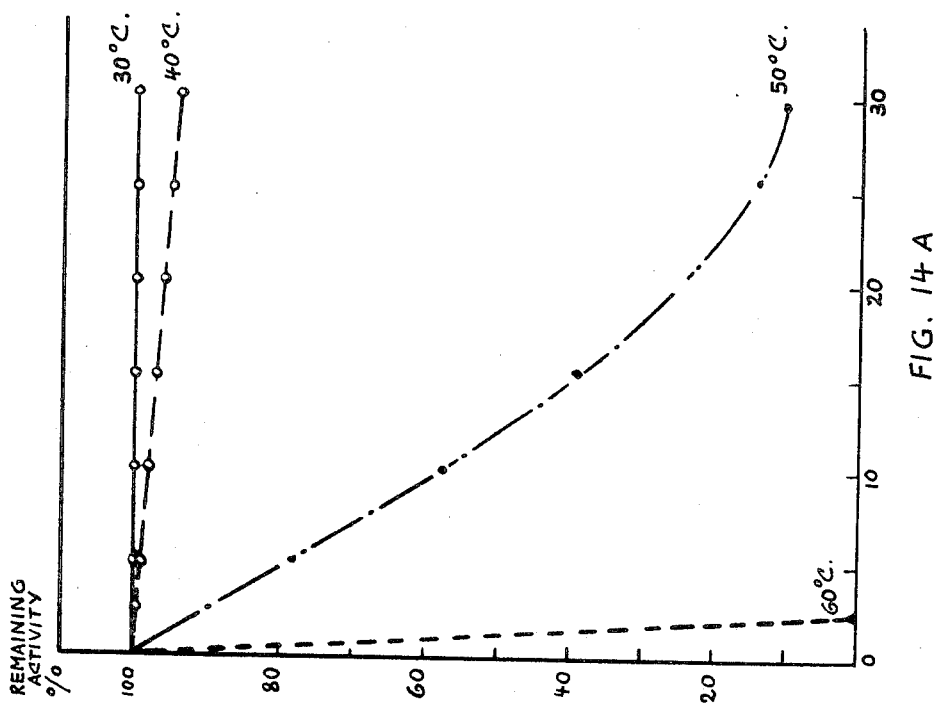
Figure 14B:
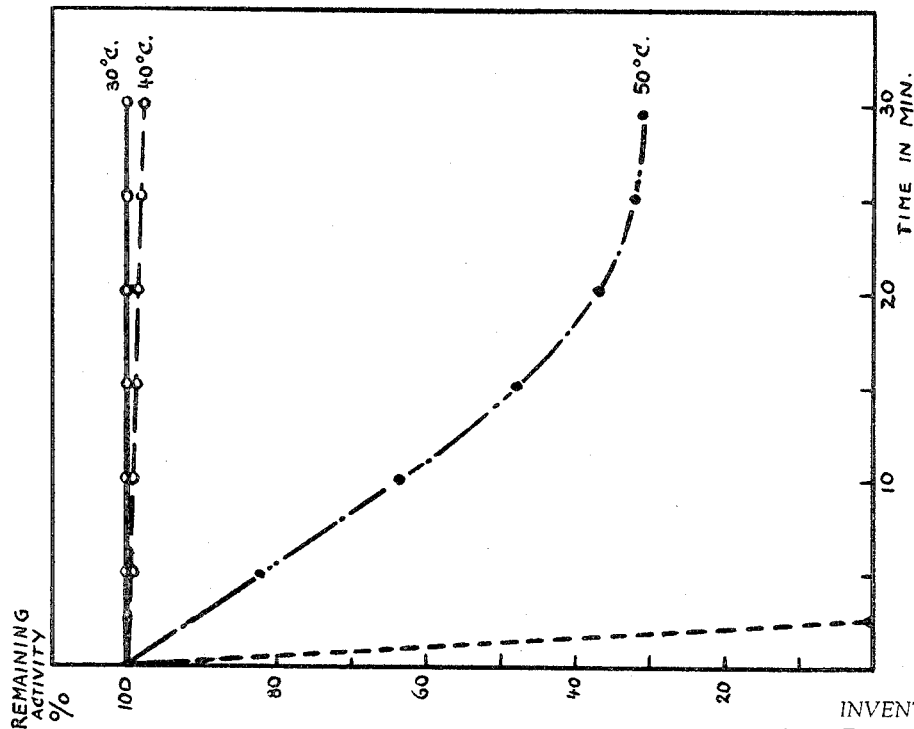

FIGS. 14A, 14B, and 14C show the rate of inactivation of the proteases at different temperatures, whereby FIG. 14A illustrates the inactivation of protease I, FIG. 14B that of protease II, and FIG. 14C that of protease III.

Figure 15:
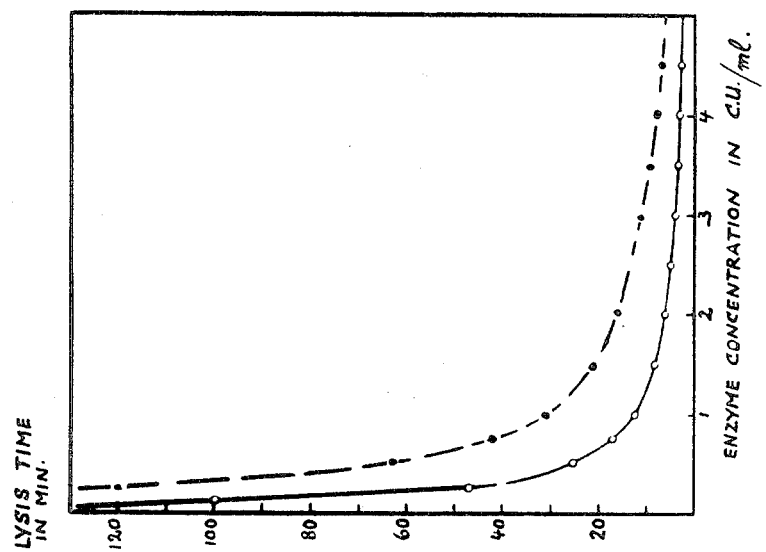
Figure 14:
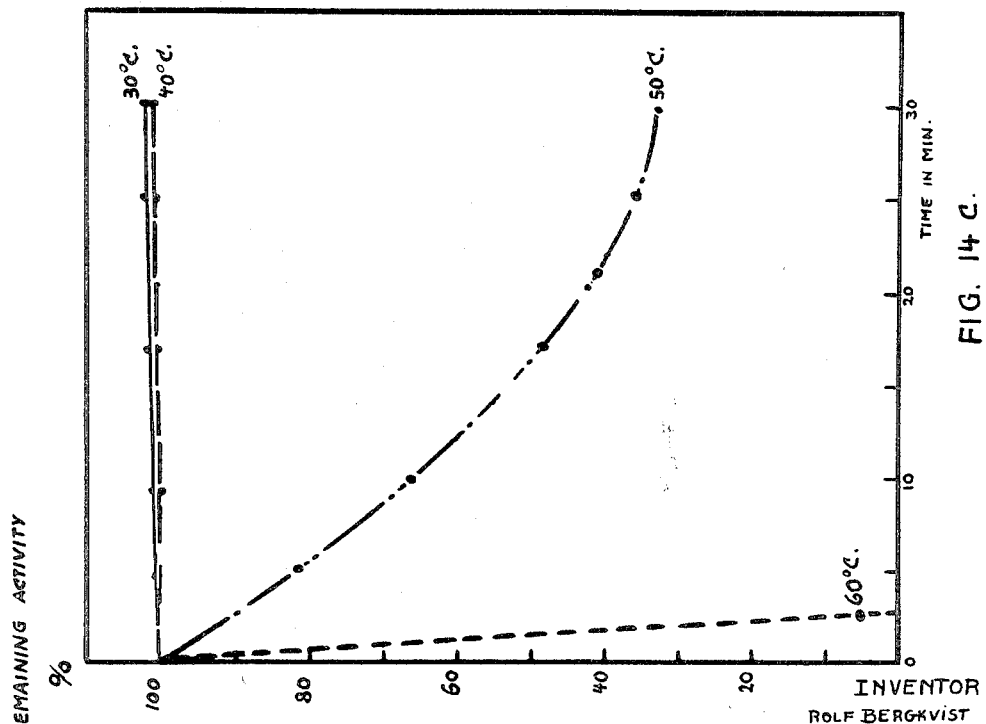

FIG. 15 shows the dose-response curve of proteases I and II regarding lysis of fibrinogen.

Figure 16:
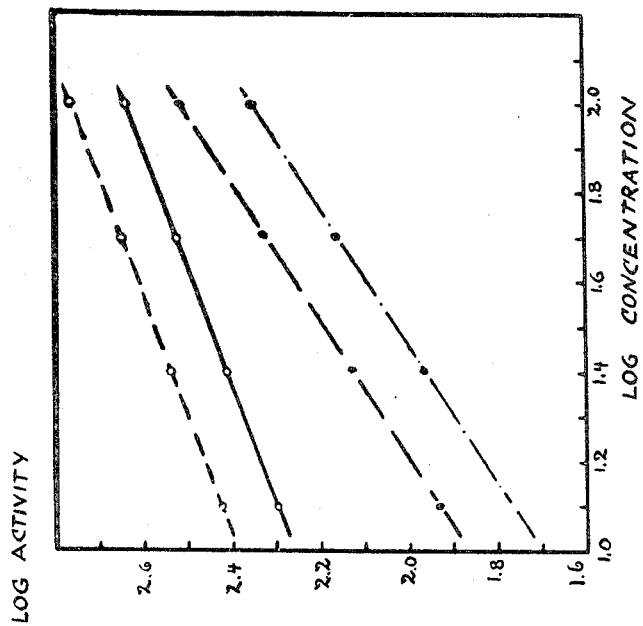

FIG. 16 represents the results obtained by determining the fibrinolytic activity of proteases I and II on normal and heated fibrin plates.

Figure 17:
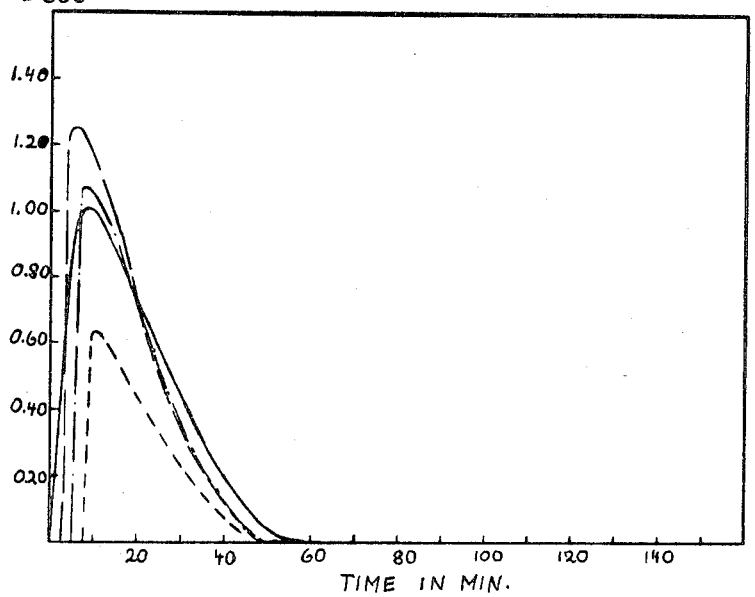
Figure 17:
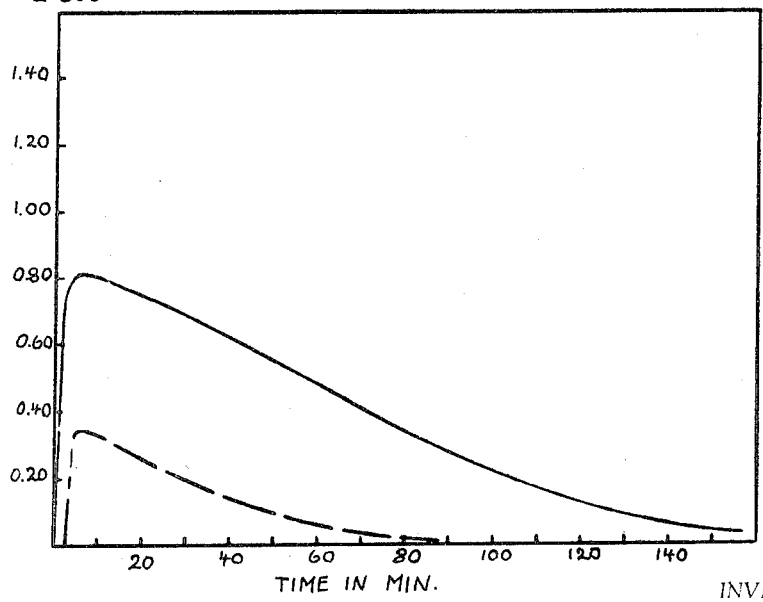

FIG. 17A and FIG. 17B illustrate the inhibition of clot formation by thrombin and lysis by protease I or, respectively, protease II.

Figure 18:
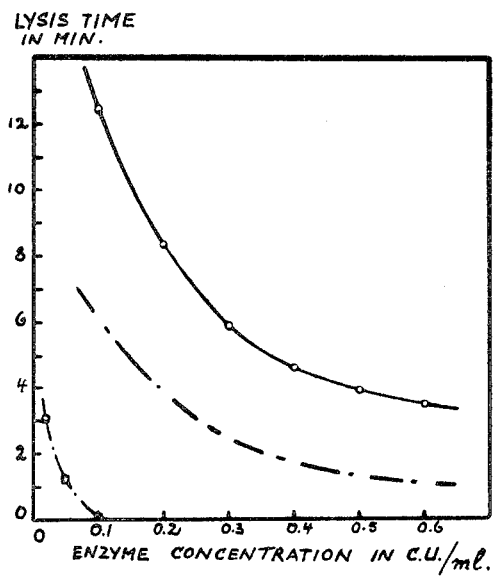
Figure 18:
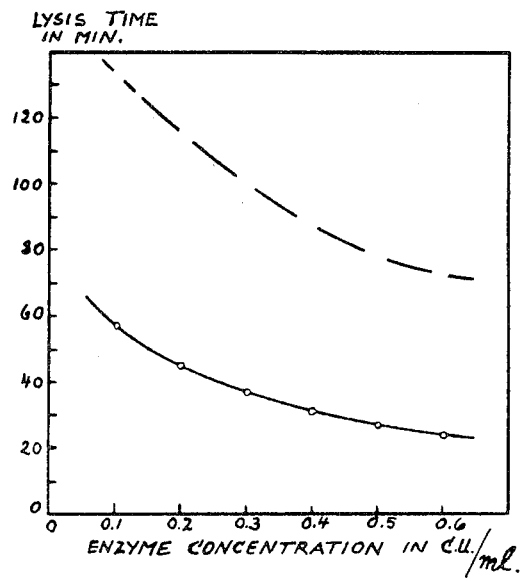

FIG. 18A and FIG. 18B show the fibrinogenolytic and fibrinolytic activity of protease I or, respectively, protease II.

Figure 19:
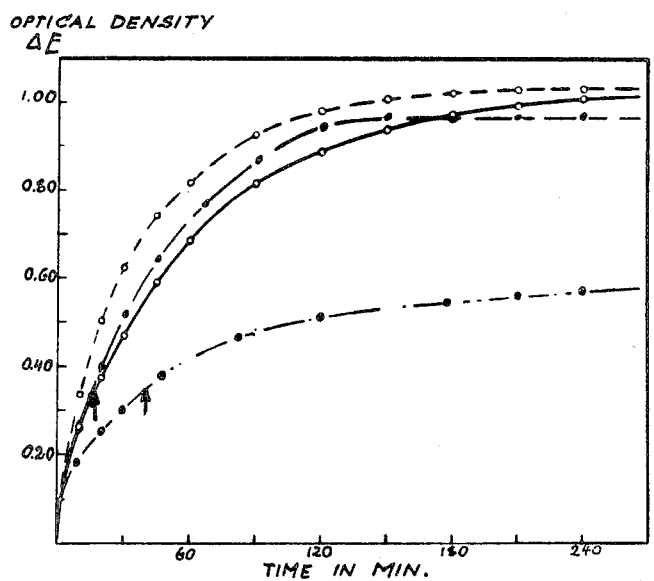

FIG. 19 illustrates the comparative rates of release of trichloro acetic acid-soluble compounds by proteases I and II mixed with fibrinogen or fibrin.

Figure 20:
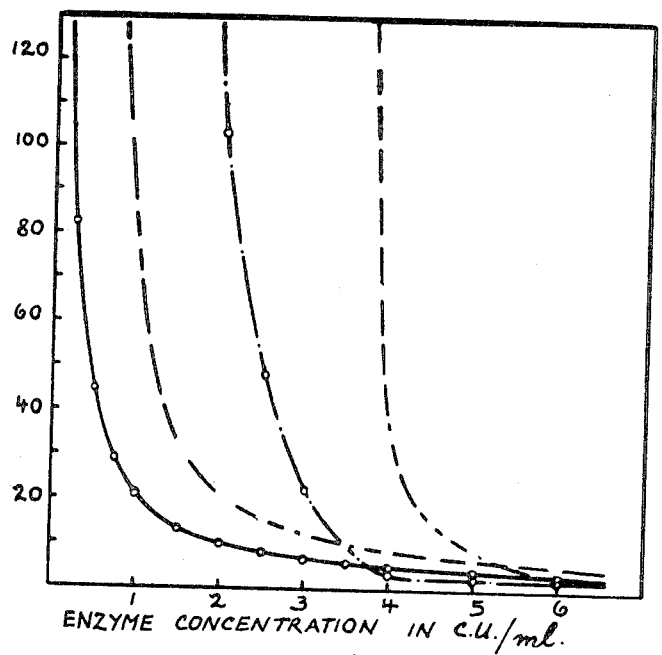
Figure 21:
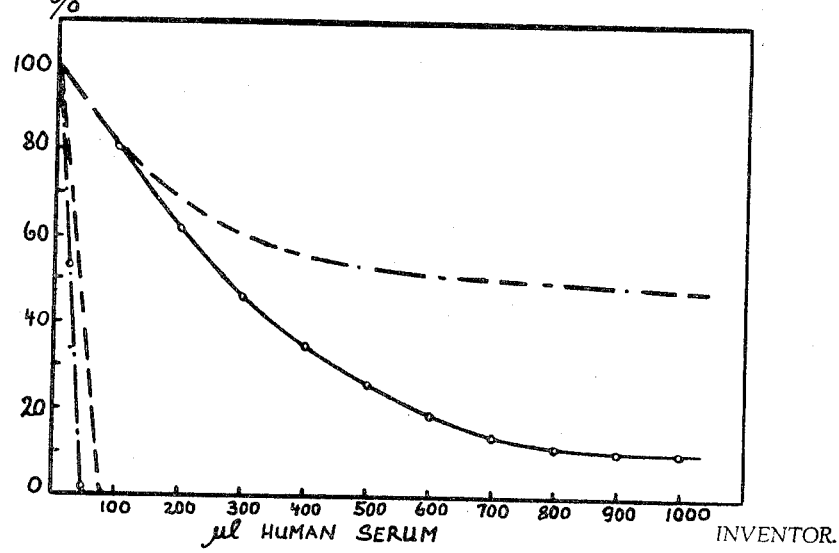

FIG. 20 represents the lysis time of fibrin clots by proteases I and II in comparison with that of chymotrypsin and trypsin in the presence of human serum, and FIG. 21 the inhibitory effect of human serum on casein digestion by the enzymes of FIG. 21.

Figure 22:
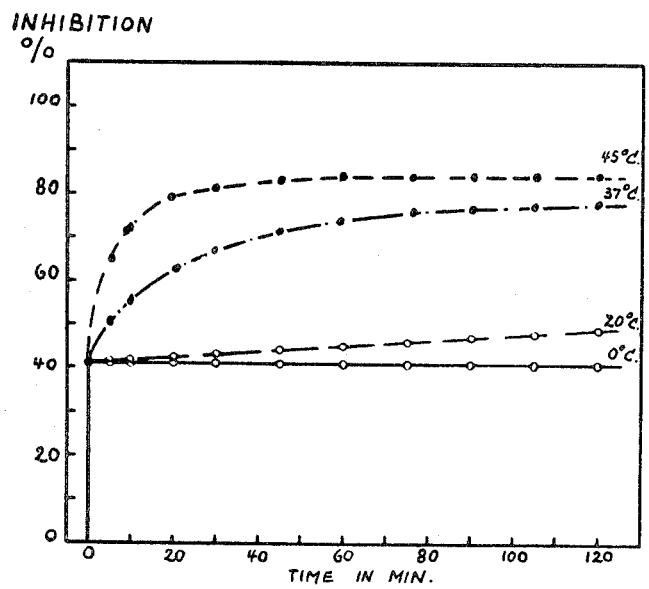
Figure 22:
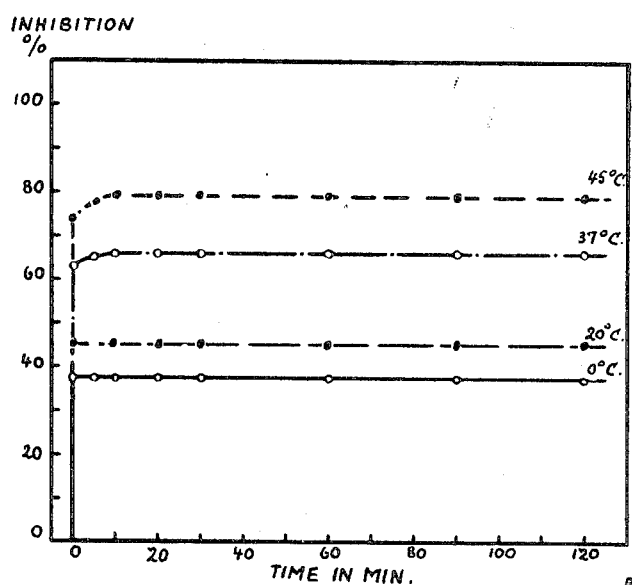

FIG. 22A and FIG. 22B shows the inhibitory effect, in percent, of serum at different temperatures on the fibrinolytic activity of protease I or, respectively, protease II.

Figure 23:
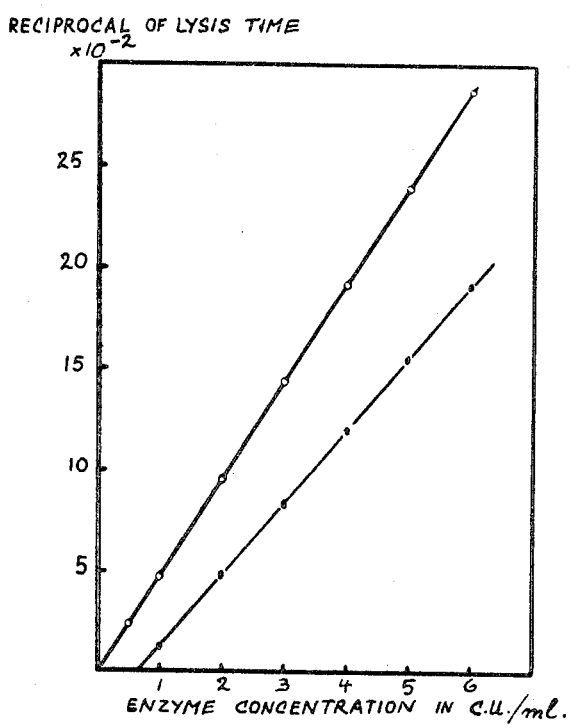
Figure 23:
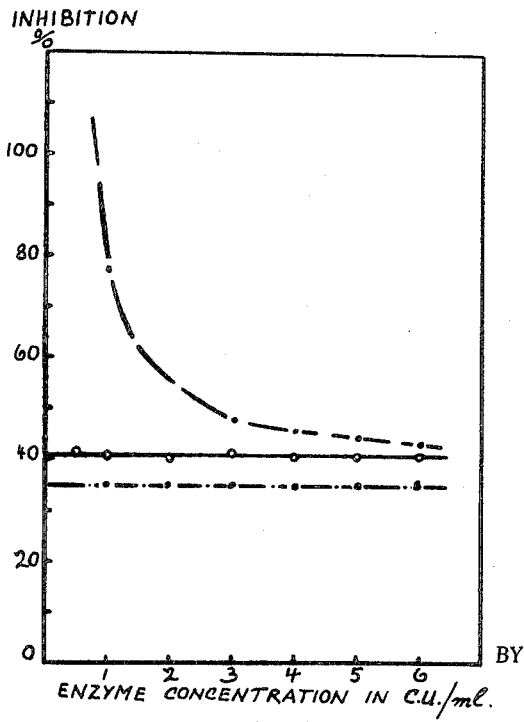

FIG. 23A illustrates the linear relationship between the reciprocal value of the lysis time and the concentration of protease I and II, while FIG. 23B shows the inhibition, in percent, as a function of the enzyme concentration.

Figure 24:
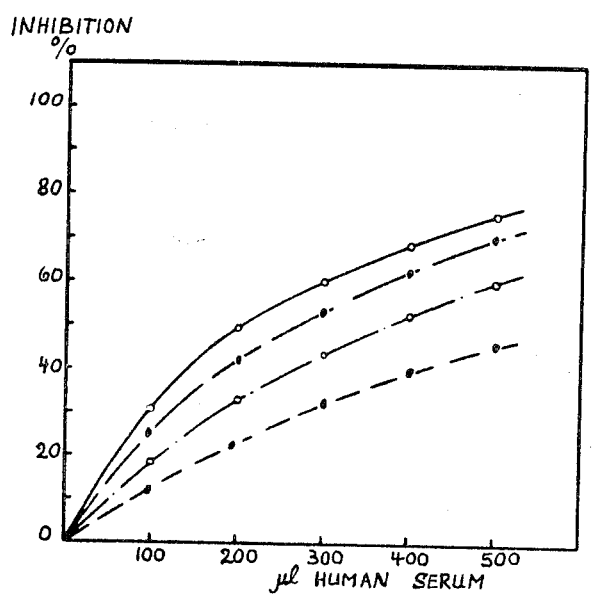
Figure 24:
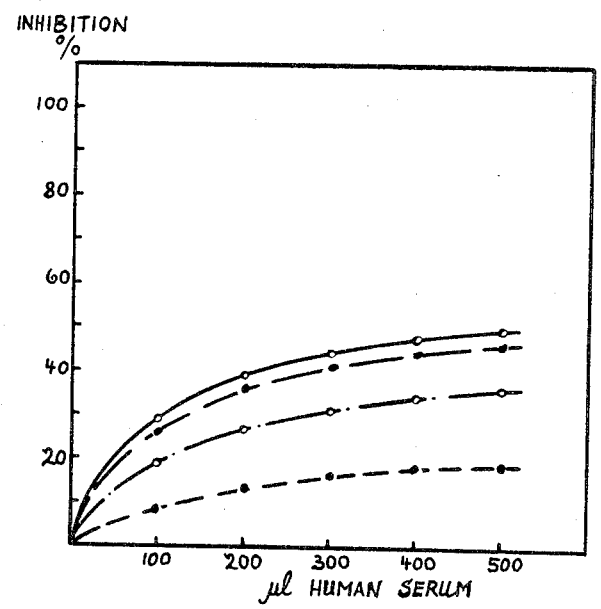

FIG. 24A and FIG. 24B show the effect of different concentrations of fibrin on the inhibition of protease I or, respectively, of protease II by human serum inhibitors.

Figure 25:
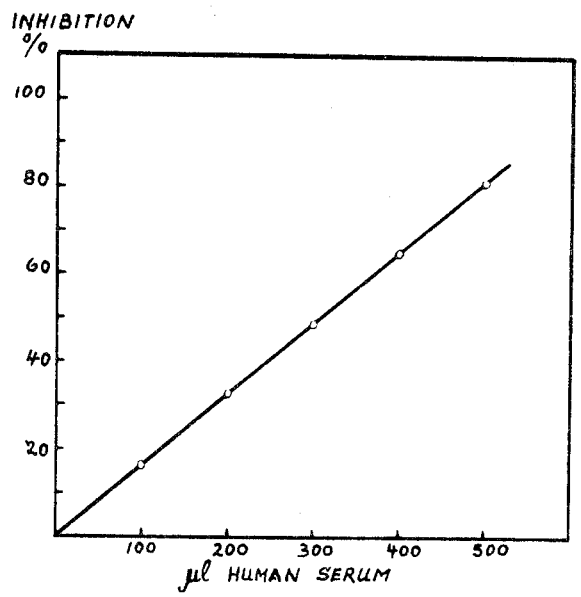

FIG. 25 illustrates the inhibition of protease II by one of the inhibitors of human serum.

Figure 26:
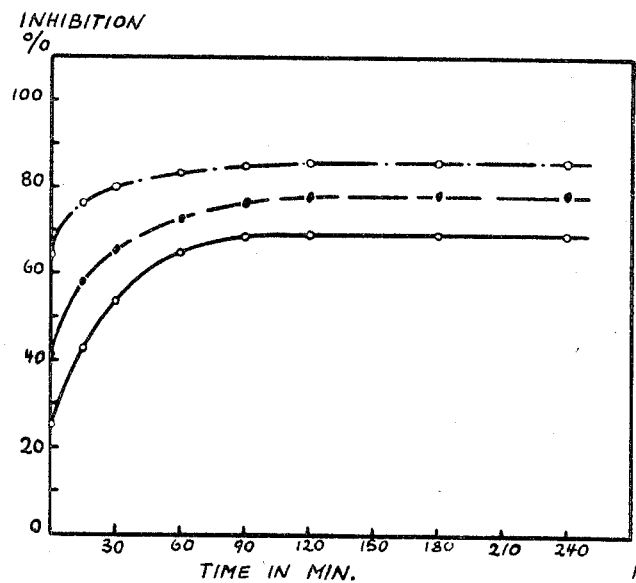

FIG. 26 illustrates the inhibition of protease I at 37° C. by varying amounts of serum.

FIGS. 27A, 27B, 27C, and 27D demonstrates the presence of antiproteolytic substances in human serum while FIG. 27E shows the distribution of the proteins in various fractions of human serum as obtained by continuous flow paper electrophoresis.

Figure 28:
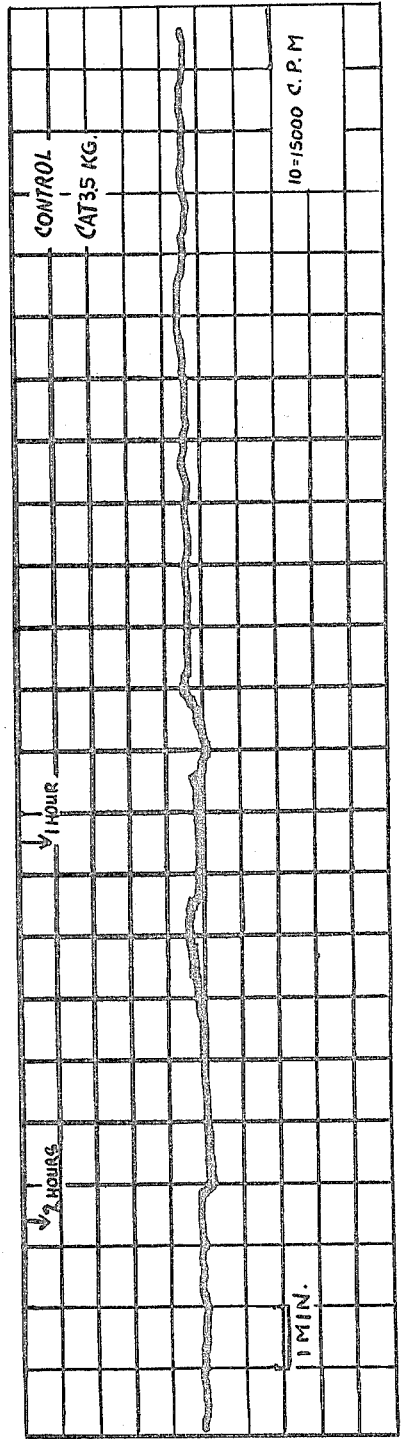
Figure 28:
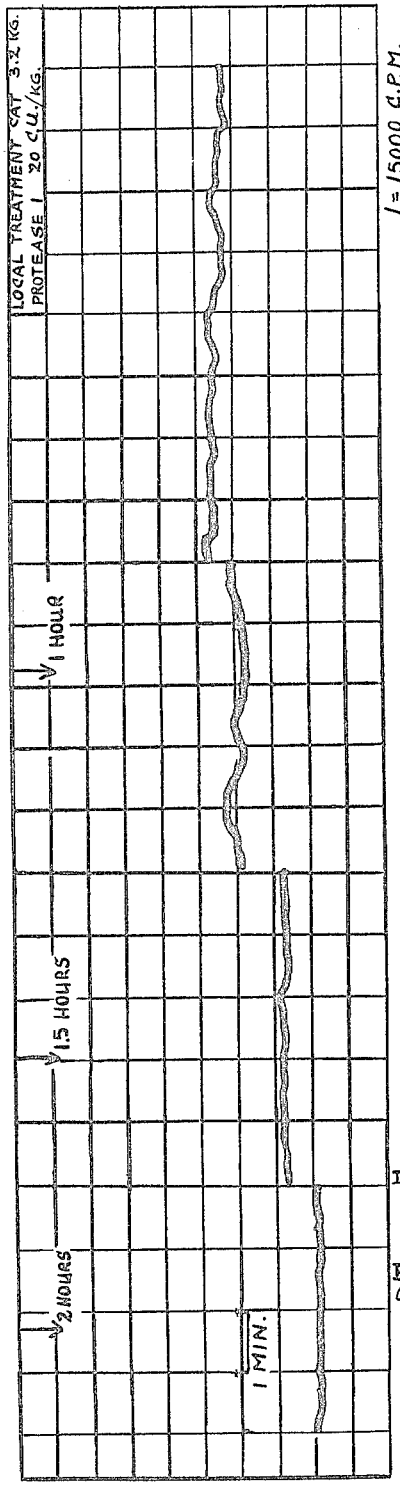

FIGS. 28A, 28B, and 28C show the thrombolytic activity of protease I whereby

FIG. 28A is a control test,

FIG. 28B illustrates the results of a local treatment and

FIG. 28C the results of systemic treatment.

FIG. 29 illustrates the purification of labelled protease I.

Figure 31:
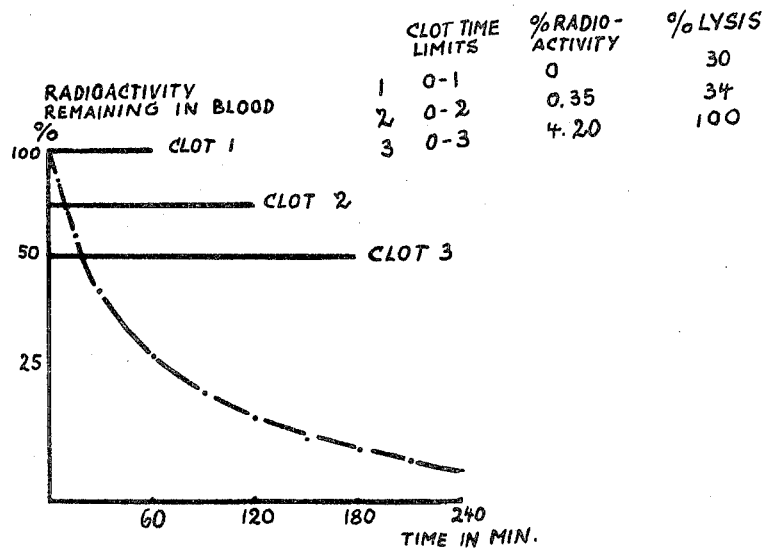

FIG. 30 and FIG. 31 show the blood clearance of radioactive protease I in two cats and the lysis in percent.

Figure 32:
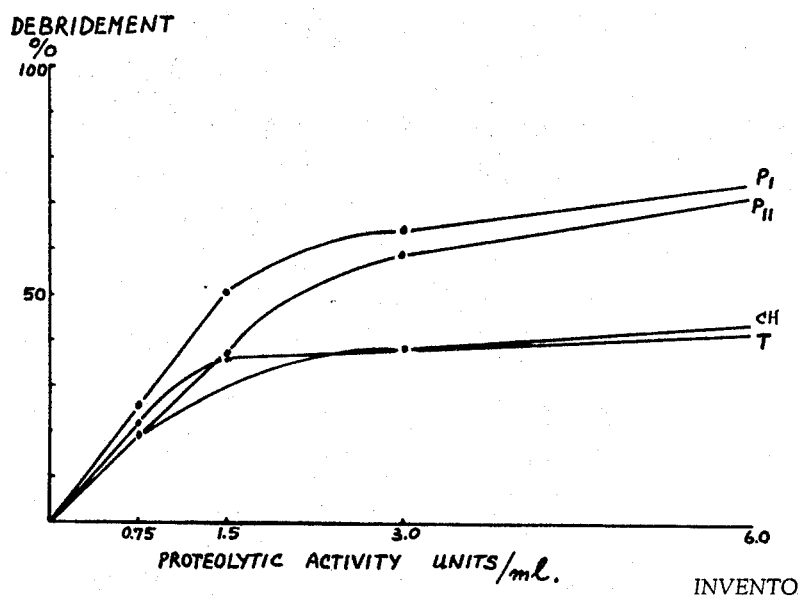

FIG. 32 illustrates the debriding effect of protease I, protease II, tryspin, and chymotrypsin.

Figure 33:
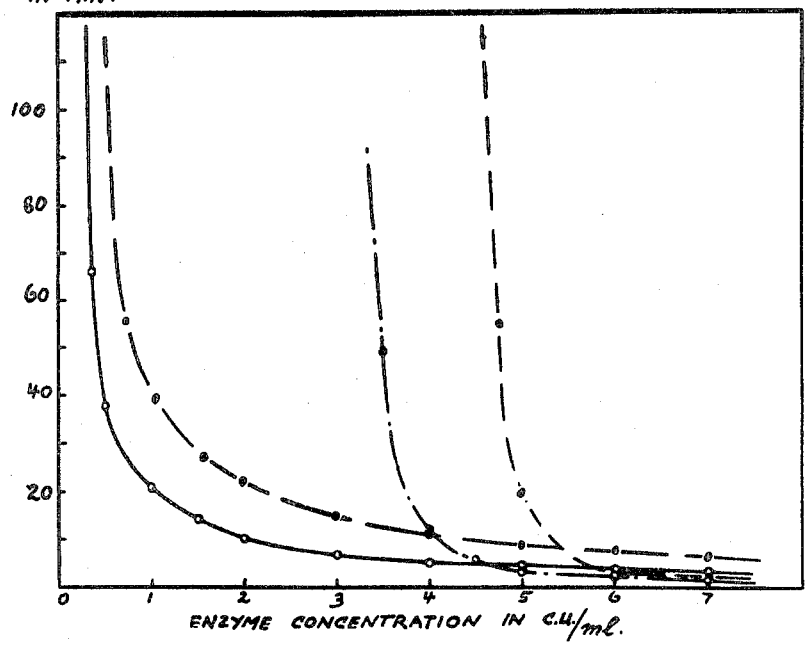
Figure 33:
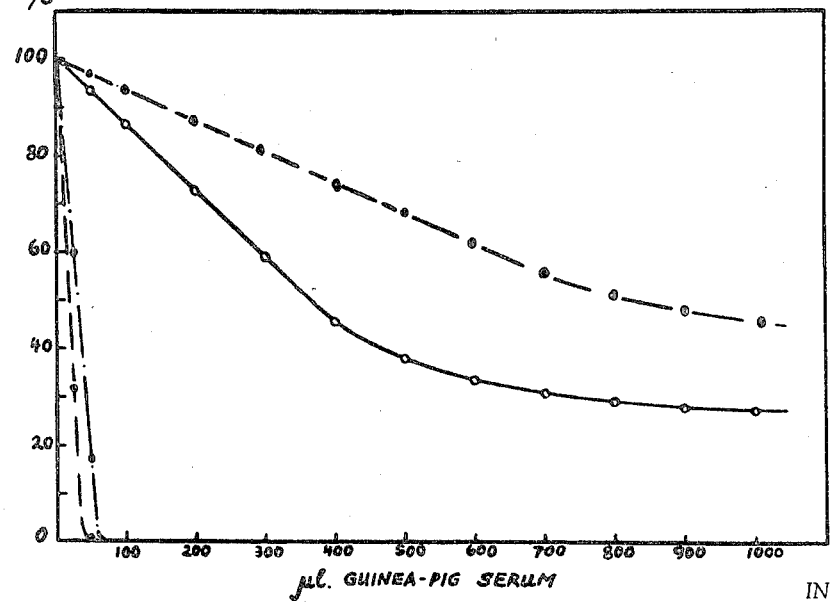

FIG. 33A illustrates the clot lysing effect of protease I, protease II, tryspin, and chymotrypsin.

FIG. 33B shows the inhibitory effect of guinea pig serum on the casein digestion by said enzymes.

The present invention will hereinafter be illustrated by a more detailed description of the purification procedure, the testing methods, and the clinical use of the enzymes obtained from *Aspergillus oryzae*. However, the invention is not limited to such a description which merely serves to illustrate a preferred embodiment of the present invention.

In principle the process is carried out as follows:

The crude protease solution, obtained an submerged cultivation, contains, in addition to the proteases and other enzymes, various impurities, such as high molecular organic compounds including polysaccharides, glucoproteins, nucleoprotein, coloring matter, etc., which are the metabolic and autolytic products of the microorganism used, and also low molecular compounds, for instance, inorganic compounds which might be part of or derived from the culture medium. Although the activity of the protein-hydrolyzing enzymes is high enough to be measured accurately, the total protein concentration of such crude solutions is too low for satisfactory purification according to conventional procedures, such as salting out by the addition of ammonium sulfate or by precipitation with organic solvents.

Several purification methods have been tried. The best preliminary purification method was found to be selective precipitation of the proteins including the proteolytic enzymes by means of tannin followed by removing the tannin by washing with acetone. The principal factors governing the effectiveness of the precipitation of the proteases, were tannin concentration, pH-value, and temperature.

The relationship between tannin concentration and the amount of protease precipitated as well as the dependence of the yield on the pH-value and the temperature were determined by preliminary tests.

Figure 5:
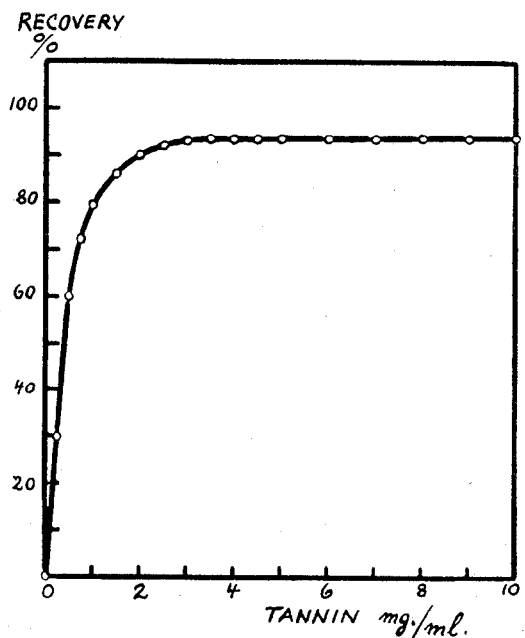
FIG. 5 illustrates the recovery of the proteases in percent from the culture liquid of *Aspergillus oryzae* after precipitation at pH 5.5 by the addition of varying amounts of tannin.
Figure 6:
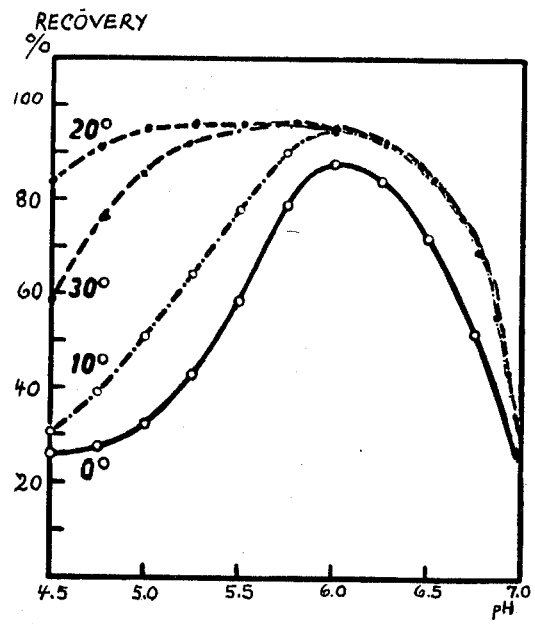
FIG. 6 illustrates the recovery of said proteases in percent by tannin precipitation at different pH-values and temperatures.

FIG. 5 shows the relationship between tannin concentration and the amount of proteases precipitated, while FIG. 6 shows the effect of pH-value and temperature upon the recovery of proteases. It is evident that an amount of 3.0 g. of tannin per 1000 cc. of culture filtrate (FIG. 5) adjusted to a pH of 5.5 on standing for two hours at 20° C. (FIG. 6) produces the highest recovery rate.

On the basis of these results the following method for the concentration of the protease-containing proteinaceous mixture was adopted.

The culture filtrate, obtained by filtering the culture, was adjusted to a pH of 5.5. Almost quantitative precipitation of the proteases was achieved by the addition of tannin in such an amount that the final concentration was 3.0 g. of tannin per 1000 cc. of the filtrate. After standing at room temperature for at least two hours the precipitate was isolated by centrifuging, was freed from tannin by repeated dispersion in acetone and centifuging, and was finally dried in a vacuum.

The resulting crude mixture of proteases can be purified without difficulty. The dry powder retains its proteolytic activity for more than one year. It is readily soluble in water and buffer solutions. By proceeding as described it is possible to prepare protease solutions which are more than 2000 times as active as the original culture filtrate.

The crude protease mixture thus obtained on cultivating of *Aspergillus oryzae* proved to contain three proteases. These proteases have different specificity towards different substrates, which is apparent, from the curves of FIGS. 3A, 3B, and 3C. Of these figures, FIG. 3A illustrates the gelatinase activity determined by measuring the reduction in relative viscosity of a 5% gelatin solution in Britton-Robinson buffer solution at the given pH-value at 37° C. after a digestion period of 5 minutes.

Figure 3:
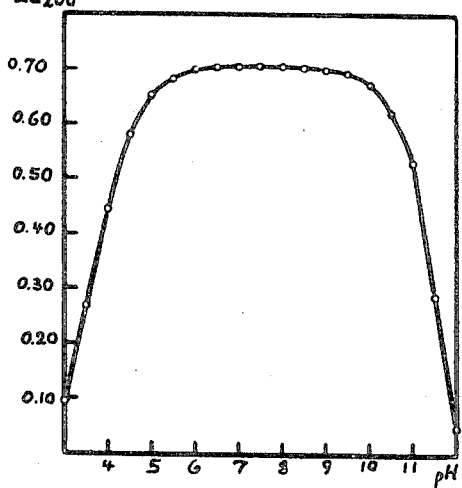
FIG. 3A shows the gelatinase activity of the crude protease mixture as a function of the pH.
FIG. 3B shows the hemoglobinase activity of the crude protease mixture as a function of the pH.
FIG. 3C shows the caseinase activity of the crude protease mixture as a function of the pH.
Figure 3:
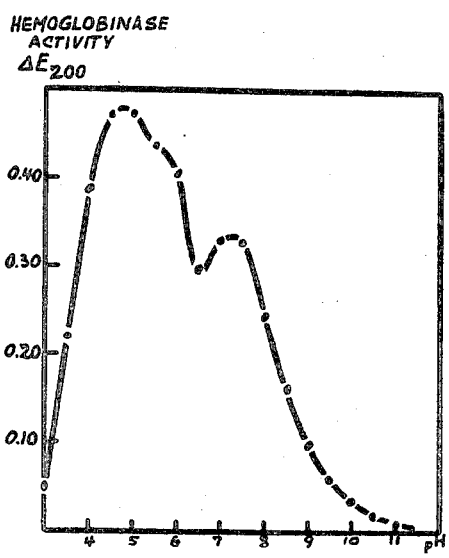

FIG. 3B illustrates the hemoglobinase activity determined by the rate of hydrolysis of about 2% solution of urea-denatured hemoglobin after incubation at 37° C. for 10 minutes whereby the increase in optical density of the trichloro acetic acid filtrate is used as a measure of protease activity.

Figure 3C:
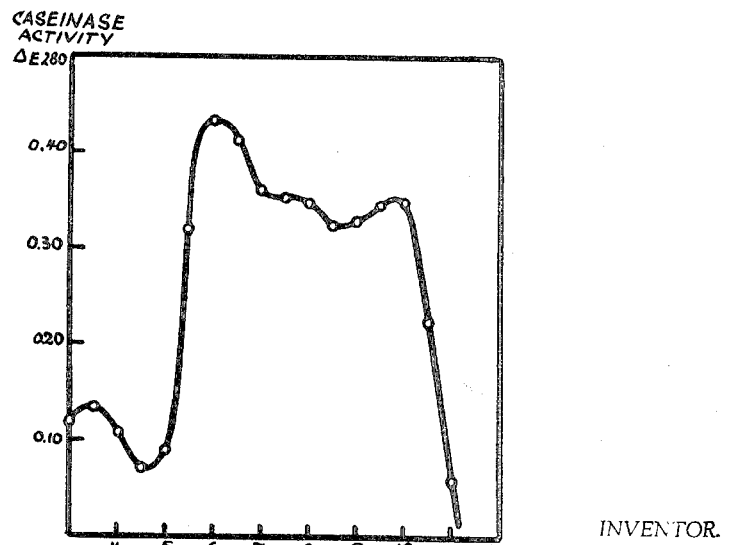

FIG. 3C illustrates the caseinase activity determined by the rate of hydrolysis of a 1.5% casein solution in Britton-Robinson buffer solution after incubation at 37° C. for 30 minutes, whereby the increase in optical density of a trichloro acetic acid filtrate is used as a measure of protease activity.

The board pH-maximum obtained on digestion of gelatin indicates the possibility that more than one enzyme may be present. The effect of the pH-value on the rate of hydolysis of casein suggests that at least three proteases are present. However, casein, which is insoluble at a pH between 4.0 and 5.0 is not a perfect substrate and the apparent existence of a protease with an optimum at a pH of about 3.0 could be misleading.

When denatured hemoglobin is used as substrate, the pH-activity curve differs greatly from those obtained with casein and gelatin. Several enzymes are also involved in its digestion.

Figure 7:
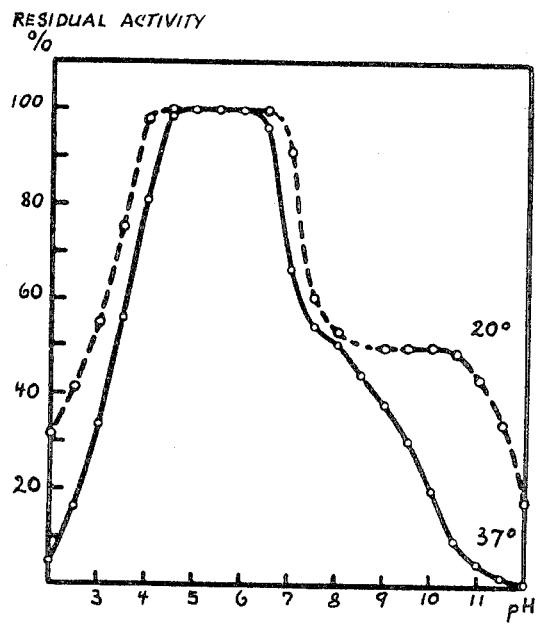
FIG. 7 shows the pH-stability of the crude protease mixture determined by casein digestion.

The proteolytic enzymes are relatively unstable compounds with a tendency to undergo denaturation and inactivation under unfavorable conditions. Therefore, the stability limits of the mixture of proteolytic enzymes were determined especially with respect to the effect of the pH-value thereon in order to find out under which conditions further purification must be carried out. The proteolytic enzymes produced by *Aspergillus oryzae* are stable at room temperature within a pH-range between 4.5 and 6.5 (FIG. 7). They tend to be irreversibly destroyed when exposed to lower or higher pH-values. Whether irreversible destruction takes place, is tested by exposing the enzymes to varying pH-values for a predetermined period before measuring their activity at a pH-value at which they are stable.

Figure 8:
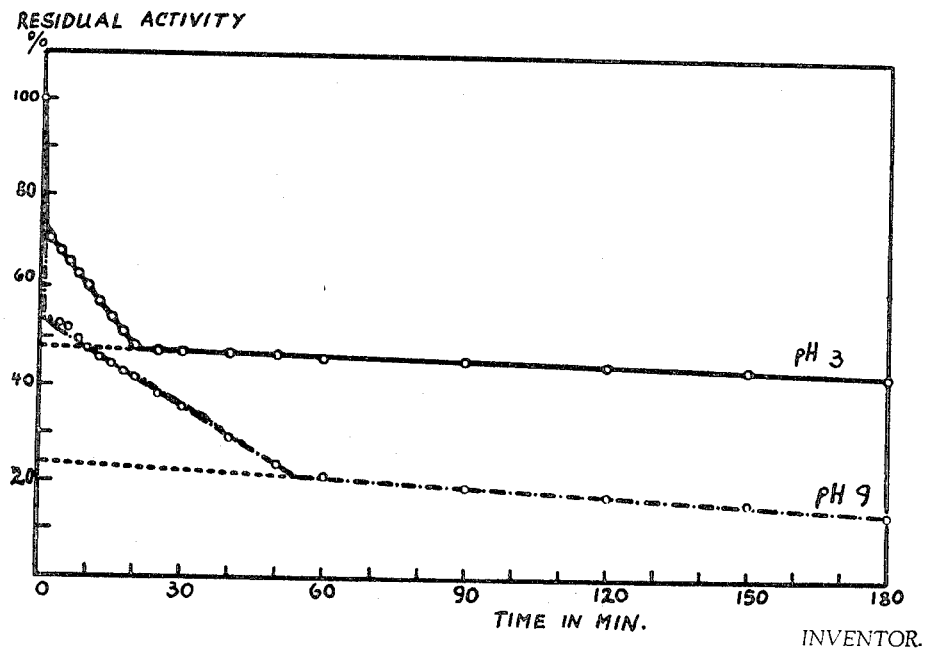
FIG. 8 shows the rate of inactivation of the proteases at pH 3.0 and pH 9.0 after incubation for different periods of time at 37° C.

The amounts of different proteases present in an enzyme preparation were determined by studying the effect of the pH-value on their inactivation. The amounts of the different enzymes in the enzyme mixture calculated in percent of the total proteolytic activity were determined at a pH of 6.0 with casein as substrate. The corresponding values obtained after preliminary incubation at a pH of 3.0 and a pH of 9.0 respectively. FIG. 8 illustrates the rate of inactivation of the proteases at a pH of 3.0 or a pH of 9.0 after incubation for different periods of time at 37° C.

The data given in the following Table 1 show the amounts of protease I, II, and III relative to the total proteolytic activity of pH 6.0.

TABLE 1

| Enzyme | Protease I | Protease II | Protease III |
| --- | --- | --- | --- |
| pH 3.0 | 27.0 | 25.0 | 48.0 |
| pH 9.0 | 29.0 | 24.0 | 47.0 |

The partial activities were determined by means of the method of separating the proteases by continuous electrophoresis at the pH of 4.5, 6.0, and 8.5. The fractions were analyzed by the caseinase method at the pH of 6.0 and of 7.4. The amounts are given in Table 2 in percent of total activity.

TABLE 2

| Enzyme | Protease I | | Protease II | | Protease III | |
| --- | --- | --- | --- | --- | --- | --- |
| Caseinase pH | 6.0 | 7.4 | 6.0 | 7.4 | 6.0 | 7.4 |
| Electrophoresis at pH 4.5 | 29.0 | 66.0 | 23.5 | 34.0 | 47.5 | |
| At pH 6.0 | 28.5 | 65.0 | 24.0 | 35.0 | 47.5 | |
| At pH 8.5 | | 65.0 | | 35.0 | | |

The values of Table 2 evidently correspond well with those given in Table 1 in spite of the fact that the methods used are quite different.

The electrophoretic studies clearly disclose the presence of three proteases in the crude enzyme preparation obtained from *Aspergillus oryzae*. The crude enzyme mixture, however, is much more complex than revealed by such electrophoretic studies. Repeated electrophoresis at other pH-values shows that the different fractions obtained thereby do not represent individual proteins but complex mixtures thereof. The proteases however, could be separated and quantitatively determined.

It was found that ion exchange chromatography can be used for fractionating and purifying the proteolytic enzymes. This is rather surprising in view of the fact that the difficulties encountered in operating with compounds of the complicated structure of enzyme systems are quite different in character and extent from those encountered in the chromatographic treatment of compound of less complicated structure.

The instability of the enzymes themselves imposes considerable limitations on the choice of the eluting agent and requires specific conditions of operation, such as low temperature and restricted pH-ranges. The most important limitation of the ion exchange resins is their power of irreversibly binding proteins. This may be the result of a formation of too many bonds between protein and adsorbent so that simultaneous dissociation of all such bonds is prevented except under conditions destructive to the native configuration of the molecule.

Among the types of adsorbents now available, those based on cellulose and dextran have proved to yield best results due to their relatively low flow resistance as well as to their relatively low binding power for proteins. These adsorbents are available either as anion exchange agents or as cation exchange agents and both types can be used in the chromatographic purification of the proteases. The adsorbed protein is firmly bound, and numerous electrostatic bonds between the protein and the adsorbent are formed. Elution can be accomplished by changing the pH-value to reduce the number of electric charges on the protein or adsorbent, or by raising the salt concentration to compete for the existing charges.

One of the methods of separating the proteases consists in subjecting the crude protease mixtures to chromatography on diethylamino ethyl cellulose columns (3.0 cm. diameter and 40 cm. height) buffered to a pH of 6.0 by the addition of 0.01 molar phosphate buffer solution. 2 g. of the dialyzed enzyme mixture dissolved in 15 cc. of the buffer solution are applied to the column. The volume of each eluate fraction is 5 cc. and the temperature 4° C. The results of this chromatographic treatment are illustrated graphically in FIG. 4. Therein the solid line represents absorption at 280 m$\mu$. The shaded areas show the relative caseinase activity at a pH of 6.0.

The salt concentration of the eluting agent is changed step by step at the points marked by the integers 1 to 5 inclusive on the graph, whereby each integer indicates the use of the following buffer solution:

(1) 0.01 molar phosphate buffer solution;
(2) 0.10 molar phosphate buffer solution;
(3) 0.25 molar phosphate buffer solution;
(4) 0.50 molar phosphate buffer solution;
(5) 0.50 molar phosphate buffer solution; plus 0.50 molar sodium chloride solution.

These experiments prove that the crude product is resolved into at least 8 distinct peaks designated by A to H in the order of their elution. The manner in which elution of the proteins proceeds, is determined by measuring the optical density of the fractions at 280 m$\mu$. The eluate fractions are also tested for their proteolytic activity. When eluting as described with both analytical as well as preparative columns, the position of the chromatographic peaks is always readily reproduced. On subjecting each of the resulting protease fractions to the same chromatographic treatment, elution showed only one peak at the same salt concentration as in the above mentioned experiment. The behavior of the fractions on rechromatography indicates that true fractionation has been achieved.

The three proteolytic enzymes earlier referred to as protease I, II, and III were found in peaks A, E, and G, respectively. Proteins were found in the other peaks but they have not yet been characterized. About 85–95% of the proteolytic activity applied to the chromatographic column was recovered when fractional elution was carried out at a low temperature (4° C.).

The ion exchange chromatographic treatment described hereinabove can be used for the separation of relatively large amounts of material, but the method is rather time consuming and, therefore, not quite suitable for large scale operation. For such purpose a multistage batch procedure using carboxy methyl cellulose as cation exchange agent is employed advantageously. In this manner the crude enzyme mixture can be fractionated without any appreciable loss of proteases and activity. Further separation of the proteases from other proteins can be achieved by passing the resulting fractions through columns of the same type of cation exchange agents or of other cellulosic ion exchange agents, whereby the pH-value and other conditions are varied.

Figure 2:
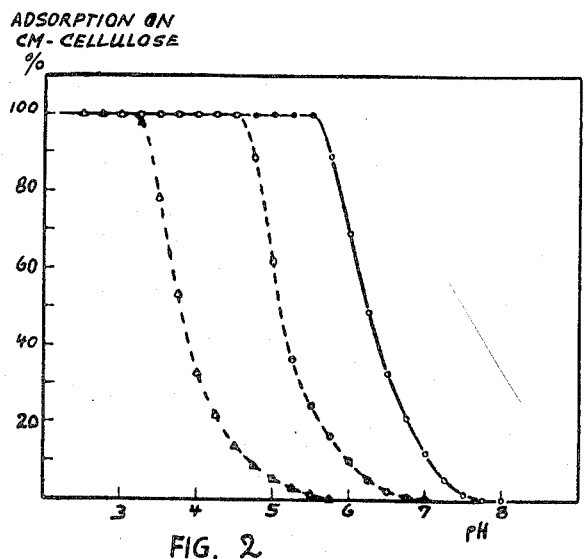
FIG. 2 illustrates the adsorption of proteases I, II, and III on carboxy methyl cellulose as a function of the pH-value. Completeness of adsorption was determined as the change in caseinase activity of the soution at pH=6.0.

The proteases I, II, and III are quantitatively adsorbed on the cation exchange agent carboxyl methyl cellulose at pH-values below 5.5, 4.5 and 3.0, respectively, as is shown in FIG. 2, wherein the line —⊗—⊗—⊗—⊗—⊗— represents the course of adsorption of protease I, —o—o—o—o— the course of adsorption of protease II, and —△—△—△—△— the course of adsorption of protease III.

In principle, separation of the proteases I, II, and III according to the present invention is carried out in the following manner:

Tannin-precipitated protease preparations serve as starting material. Such a preparation is dissolved in water at a pH below 6.5 to a final concentration of 2 g. per liter. The solution is adjusted to a pH of 5.5 and stirred with the ion exchange material at room temperature.

The amount of ion exchange agent used must be in large excess over the amount actually required. As is shown in the flow sheet of FIG. 1, an amount of 2 g. for one liter of solution yields satisfactory results.

After equilibrium has been attained, the solution is removed by centrifuging. Although most of the liquid is separated by centrifuging, the remaining protein-exchange agent mixture still retains considerable amounts of solution which, of course, contain unadsorbed proteins. Washing with 0.01 molar phosphate buffer solution of a pH of 5.5 removes non-adsorbed material without eluting the adsorbed proteins. The combined centrifuged solutions are adjusted to a pH of 4.5 and the procedure is repeated at such a pH in order to isolate protease II, and finally at a pH of 3.0 in order to isolate protease III.

Because the ion exchange agent must be present in an amount sufficient for adsorption of all proteases from the solution, the carboxy methyl derivative of the polysaccharide is always added in a large excess of the actually required amount.

Subsequent elution, like adsorption, is a function of the pH adjustment. Elution of the proteases is effected by stirring the ion exchange agent with buffer solution of a pH higher than that employed at the respective adsorption stage. In order to avoid inactivation of the proteases due to excessive changes in the pH-value, preferably an 0.05 molar phosphate buffer solution of the pH of 7.0 is used for elution of proteases I and II, and a buffer solution of a pH of 6.0 for elution of protease III. Repeated elution results in a recovery of more than 90% of the proteolytic activity. The overall recovery is high regardless whether starting preparations with a small or a large content of proteases are used. The fact that the proteases can be eluted under conditions favorable to the enzymes is responsible for the high yield achieved in this process. For instance, protease III, which is unstable at a pH above 6.5 is eluted at a pH of 6.0. Another factor which renders the method according to the present invention highly useful in enzyme recovery, is the speed at which adsorption and elution can be carried out. While, for instance, operation according to this batch method achieves complete separation of the proteases within one day, the above described ion exchange chromatographic method requires for the same amount of starting material several weeks.

In most cases it is advisable to concentrate the eluates for storage or for further purification by other procedures. For instance, the proteases can be precipitated by the addition of tannin or their solutions can be dialyzed and then lyophilized.

The effectiveness of the described fractionating process can readily be checked and the resulting products can further be purified by chromatography on diethylamino ethyl cellulose (DEAE-cellulose), or a diethylamino ethyl ether of a cross-linked dextran (DEAE-Sephadex by the firm, Pharmacia) or the like types of ion exchange materials. The conditions to be observed during adsorption and elution are the same as described above.

It can be proved that a highly purified protease I is obtained in this manner by the selective adsorption on carboxy methyl cellulose. The product contains only very small amounts of an inactive protein. Proteases II and III can also be obtained in a highly purified state but they still contain other proteins. Satisfactory purification, however, can readily be achieved by chromatographic adsorption on diethylamino ethyl derivatives of the above mentioned polysaccharides.

The following examples serve to illustrate the present invention more in detail without, however, limiting the same thereto.

EXAMPLE 1

Production of the enzymes

The enzymes of *Aspergillus oryzae* are obtained by submerged cultivation on a protein- and carbohydrate-rich medium as described, for instance, by James Horace and Mario Stefanini in "Proceedings Society Experimental Biology and Medicine" 1959, vol. 102, pages 201–203. Optimum yields are obtained when the culture medium contains 1% to 1.5% of proteins from such sources as soybean meal or peanut meal and, in addition, 2% to 4% of carbohydrates and also magnesium salts and phosphates.

The preferred culture medium is composed as follows:

| | G. |
|---|---|
| Sucrose | 20.0 |
| Potassium dihydrogen phosphate ($KH_2PO_4$) | 14.0 |
| Magnesium sulfate (crystals) | 1.23 |
| Cotton seed endosperm meal | 10.0 |
| Water to 1000 cc. | |

The initial pH-value of the sterilized medium is between 6.5 and 7.0. Optimum enzyme activity is usually observed on cultivation for 3 days to 4 days.

As soon as abundant spore formation occurs, substantially all the proteolytic enzymes leave their initial intracellular state and can be recovered quantitatively from the liquid culture medium. Harvesting must take place at said time since a considerable decrease in enzyme potency is observed on further cultivation. The culture filtrate obtained from the harvested culture is concentrated by tannin precipitation as described hereinafter.

EXAMPLE 2

Precipitation of proteolytic enzymes by tannin

The culture filtrate obtained according to Example 1 is adjusted to a pH of 5.5. The bulk of the proteins is then precipitated by slowly adding a 10% aqueous solution of tannin thereto until a final concentration of 3.0 g. of tannin per 1000 cc. of filtrate is attained. A voluminous precipitate is formed which, after settling for at least two hours, is recovered by centrifuging and is freed from tannin by dispersing it repeatedly in acetone, recentrifuging the dispersion, and finally drying the centrifuged solid product in a vacuum. The resulting proteolytic enzymes retain their enzymatic activity when precipitated and recovered as described. 80% to 100% of the proteolytic activity of the starting filtrate are obtained.

EXAMPLE 3

Selective adsorption process for separating the proteases from each other

Figure 1:
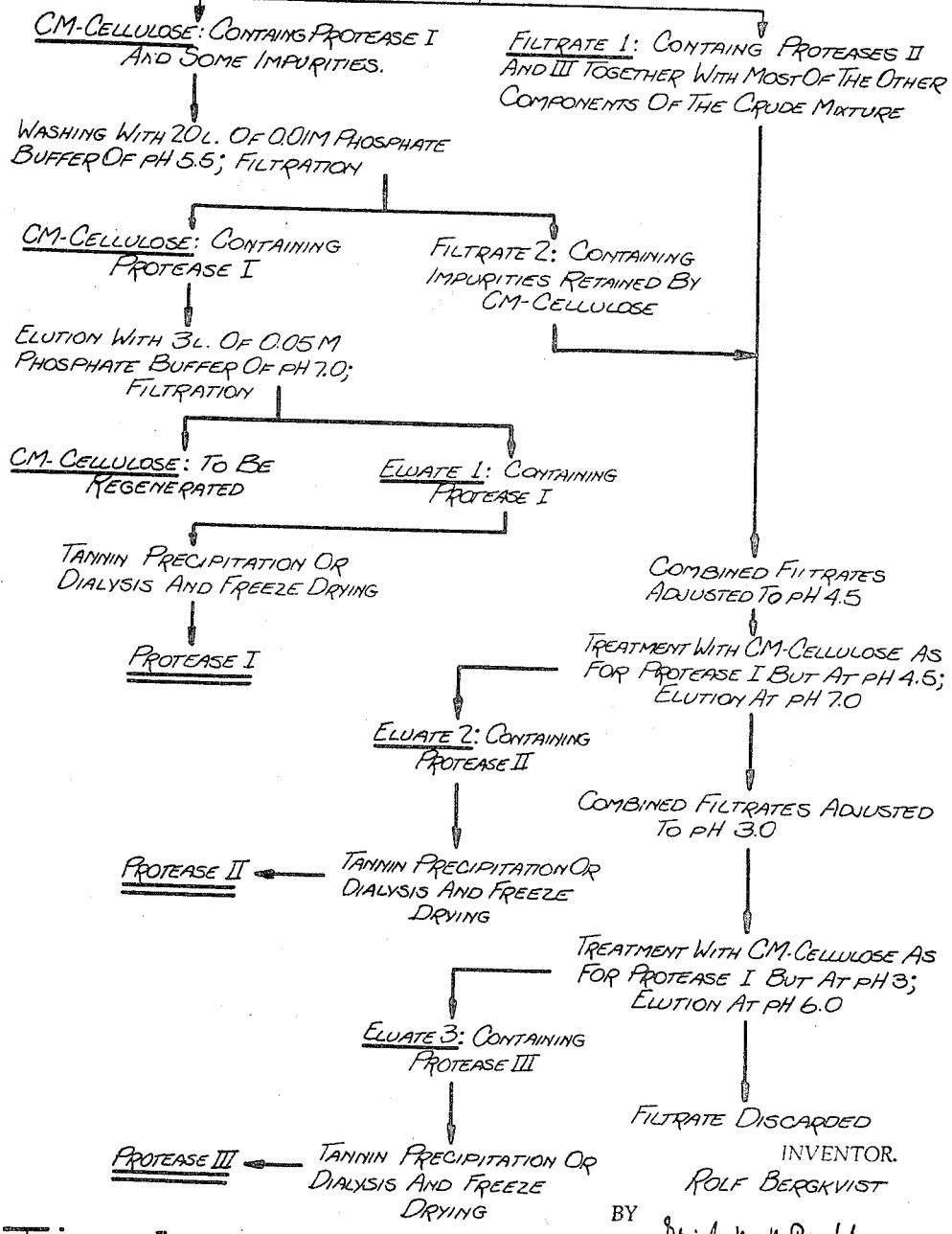

The method as illustrated in FIG. 1 is not only suitable for separating the proteases from each other but also for removing most of the impurities accompanying the same. The method can be carried out with great speed and is also suitable for large scale production. The adsorbent used is a cation exchange carboxy methyl cellulose, prepared, for instance, according to the method of Peterson and Sober from Whatman cellulose powder and chloro acetic acid. No difference in the adsorptive power of different batches of said agent which contains 0.7–0.9 milli-equivalents of carboxyl groups per g. of carboxy methyl cellulose was observed. It is of considerable importance that the pH-value of the cation exchange agent is the same as that of the protease solution to be treated. Therefore, the different batches to be used are buffered to the required pH-value in the same manner as described hereinabove for the diethylamino ethyl cellulose (DEAE cellulose).

The process is applicable to any crude *Aspergillus oryzae* protease solution, for instance, to culture liquids of said or other molds obtained by submerged cultivation. Preferably, however, crude protease mixtures obtained by precipitation with tannin are used as starting materials.

500 g. of the tannin-precipitated protease mixture is dissolved in 250 l. of an 0.01 molar phosphate buffer solution of the pH of 5.5. The pH-value of the solution is adjusted, if necessary, to a pH of 5.5. 500 g. of carboxy methyl cellulose adjusted to the same pH-value are added. The mixture is stirred at room temperature for one hour. The protein-exchange agent complex which contains protease I is separated from most of the solution by centrifuging in a basket centrifuge. The cellulose exchange agent, however, retains considreable amounts of the solution containing unadsorbed proteins and other substances.

Such unadsorbed material is removed by washing with an 0.01 molar phosphate buffer solution of the pH of 5.5.

The combined solution and wash liquids are adjusted to a pH of 4.5 by the addition of hydrochloric acid. Protease II is then adsorbed therefrom by the addition of 500 g. of carboxy methyl cellulose buffered to a pH of 4.5. Adsorption is carried out in the same manner as described above.

The resulting solution is adjusted to a pH of 3.0 and again 500 g. of carboxy methyl cellulose buffered to a pH of 3.0 are added to adsorb the protease III component of the mixture.

Recovery of the proteases from the ion exchange agents on which they are adsorbed, is effected by elution with a buffer solution of a pH higher than that used in the adsorption step. In most cases the two first adsorbed proteases I and II are eluted by means of an 0.05 molar phosphate buffer solution of a pH of 7.0 and the last adsorbed protease III by means of a buffer solution of the pH of 6.0. Repeated elution results in a recovery of more than 90% of the proteases and their activity. After elution the carboxy methyl cellulose is regenerated by washing with a solution of sodium chloride and a solution of sodium hydroxide, said solutions being 0.5 molar, and then with water to neutrality.

The above described procedure yields fully satisfactory results if the only requirement is to separate the proteases from each other and from most of the impurities. Further purification of the proteases, however, can be achieved by ion exchange chromatography on diethylamino ethyl cellulose.

Such further purification is carried out as follows:

EXAMPLE 4

*Ion exchange chromatography*

Diethylaminoethyl cellulose was prepared either from cellulose powder by the procedure of Peterson and Sober or the commercially available product was used. The anion exchange adsorbent used has a total ion exchange capacity of 0.4–0.6 milli-equivalents per g. of dry weight.

Figure 4:
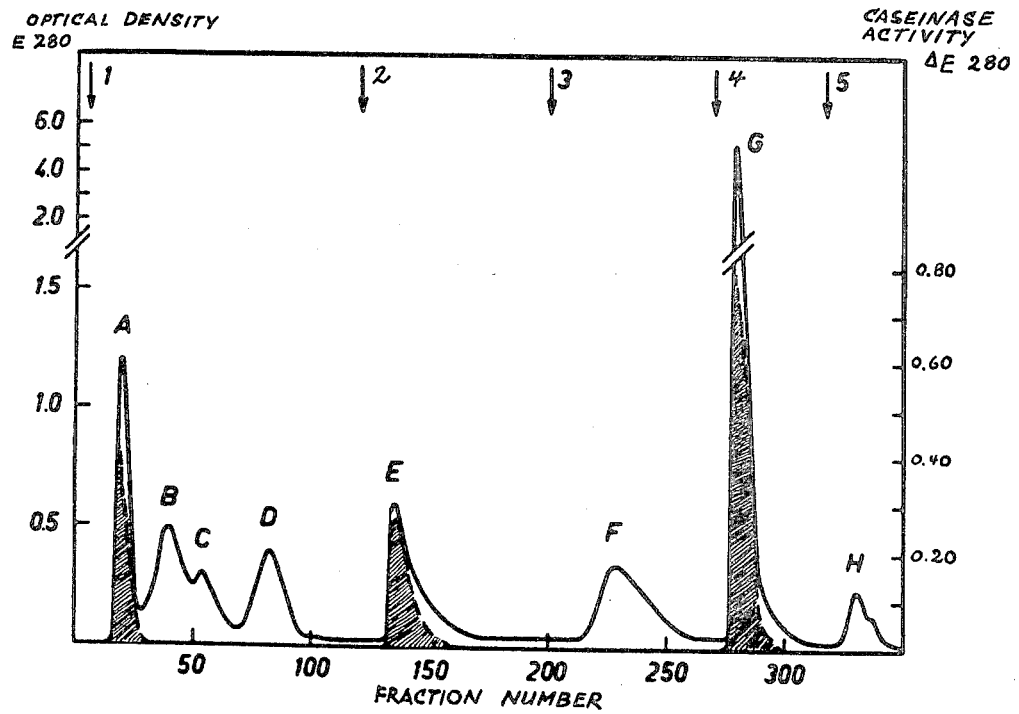
FIG. 4 illustrates the fractionation curve obtained on chromatographic adsorption of the crude protease mixture on diethylamino ethyl cellulose (DEAE-cellulose).

Before packing the column, the diethylamino ethyl cellulose is suspended in about 10 times its volume of an 0.5 molar phosphate buffer solution of the required pH-value and is stirred well at room temperature for one hour. The cellulose is allowed to settle for half an hour. Thereafter the supernatant liquid is decanted off in order to remove very small particles which do not settle. The adsorbent is then washed several times with an 0.01 molar phosphate buffer solution of the pH of 6.0, the starting buffer solution, and is then resuspended in the same buffer solution. After achieving equilibrium with this buffer solution by standing over night, a slurry of the adsorbent is poured into chromatographic glass columns of the required size. The adsorbent is allowed to settle by gravity and is further compacted by exposing it to the action of compressed air until the height of the adsorbent in the column remains constant. To insure thorough equilibrium, the columns are washed with 25 to 30 times its volume of buffer solution or until the pH-value of the effluent liquid is the same as that of the inflowing buffer. Prior to their chromatographic purification the crude proteases are dialyzed against the starting buffer solution. Separation of the impurities from the proteases is carried out by fractional elution as is shown in FIG. 4. The various fractions are collected by means of a constant volume fraction collector.

The elution of the proteins is controlled by measuring the optical density at 280 m$\mu$. The progress of elution can be assessed more readily by determining the UV-absorption of the eluent by means of an UV-absorption monitor and recording meter. In this manner a continuous graphic record of the absorption at 254 m$\mu$ of the emerging solution is obtained without requiring collection and analysis of each individual fraction.

Those fractions which show the same peaks are combined, dialyzed against cold water, and lyophilized or directly precipitated by the addition of tannin. The resulting compounds are analyzed by paper electrophoresis and are tested for their specific proteolytic activity. Smaller fractions are concentrated by ultrafiltration through a collodion membrane. The collodion bag was supplied by Membranengesellschaft of Goettingen, Germany.

After use, the diethylamino ethyl cellulose is regenerated by washing with a solution of sodium chloride and a solution of sodium hydroxide, both being of 0.5 molar concentration, and subsequently with large volumes of water until a neutral pH is obtained.

The resulting proteases I, II, and III obtained according to the preceding Example 4 are characterized by their physico-chemical properties as follows:

One-dimensional as well as continuous paper electrophoresis under various conditions proves that said proteases are substantially homogeneous. Thereby, acetate, phosphate, veronal, and phosphate-borate buffer solutions were used, and the pH range covered was from 4.0 to 9.0.

Figure 9:
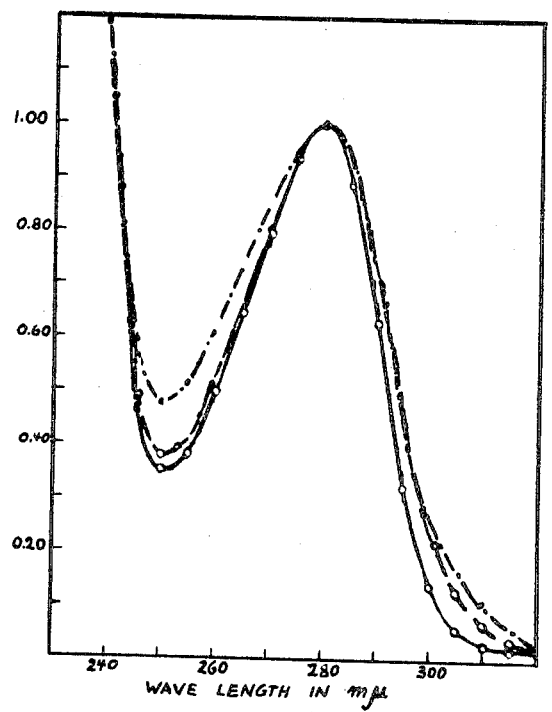
FIG. 9 shows the ultraviolet absorption spectra of the purified proteases I, II, and III in 0.05 molar phosphate buffer solution of the pH of 7.0.

The ultraviolet absorption spectra of the pure enzymes are shown in FIGS. 10A, 10B, and 10C. The main absorption band occurs for all the proteases in the region characteristically associated with proteins and aromatic amino acids. The infrared spectra were also of the pattern to be expected for proteins of this type. In FIG. 9 the proteases are indicated by the following curve lines:

–o–o–o–     Protease I
–o– –o– –o–  Protease II
–Δ–.–Δ–.–Δ– Protease III

FIGS. 10A, 10B, and 10C illustrate the effect of the pH on the proteolytic activity of the proteases whereby the above given curve lines indicate the three proteases. FIG. 10A shows the results obtained on testing the purified proteases for their activity on casein while FIG. 10B illustrates their activity on hemoglobin and FIG. 10C their activity on gelatin. These activities were determined as described hereinabove with respect to FIGS. 3A, 3B, and 3C whereby, in place of the Britton-Robinson buffer solution, the Johnson-Lindsay buffer solution was used.

It was found that casein which is soluble at a pH of 4.0 to 5.0 was not suitable for determing the pH-optimum of protease III. The pH-activity varied slightly with the buffers employed and with the substrate. The substrate had in some cases a stabilizing effect upon the enzyme, resulting in a higher pH optimum. Protease I and II have pH-optima at 7.6 to 9.5 and 6.3 to 6.8 respectively, while protease III has its optimum activity at pH 4.3 to 4.5.

The activity of the proteases on synthetic lysine and arginine esters was also studied by the method originally described by Troll et al. (J. Biol. Chem. vol. 208 (1954), p. 85). The synthetic substrates employed were unsubstituted lysine ethyl ester and tosyl arginine methyl ester, hereinafter referred to as TAME. No significant enzymatic hydrolysis of the lysine ester could be detected even after incubation for several hours at 37° C. Protease I, however, was found to hydrolyse TAME, whereas protease II and III did not affect this substrate. The substrate titration curve and the pH-optimum curve for the action of protease I on TAME are shown in FIGS. 11A and 11B. For enzyme assay, 0.04 M TAME was chosen as substrate concentration, the activity being expressed in micromoles per cc. of acid liberated after incubation for 30 minutes at 37° C. At higher substrate concentrations, striking inhibition of the enzyme action becomes apparent. It can be seen that optimum activity is obtained at pH 8.5 or about the same as that for the hydrolysis of most proteins.

The effect of the temperature on the speed of enzymatic action is rather complex. Although the initial speed increases steadily as the temperature rises, the amount of substrate actually transformed during a given time interval first rises with increasing temperatures and then falls as the temperature passes beyond a certain optimum value. Two different temperature effects are acting simultaneously, namely, increase in initial speed of proteolysis, and destruction of the enzyme at higher temperatures.

The optimum temperature is not constant, but falls as the time interval increases. FIG. 12 shows the temperature effect for an incubation period of 30 minutes. It is evident that optimum activity is found at about 50° C. for protease I and II, and at 45° C. for protease III.

The lyophilized or tannin-precipitated proteases are stable for years when kept at room temperature. In solution, however, the enzymes are rather sensitive towards heat and pH-changes.

The rate of inactivation of the proteases depends to a great extent on the pH-value of their solutions, and this effect varies greatly between the proteases. The occurrence of irreversible destruction was tested by exposing the enzymes to a range of pH-values at 37° C. for 30 minutes and then determining the remaining activity at the pH at which they are stable.

As shown in FIG. 13, the effect of the pH-value varies greatly between the proteases. Protease III, which is optimally active at an acid pH, shows also the greatest stability in acid solutions, while protease II shows stability over a much wider pH-interval than the other proteases. The enzymes are of course more stable at lower temperature at any given pH-value and the presence of a protein substrate has likewise a stabilizing effect.

In order to determine the rate of thermal inactivation, the purified proteases were heated on a water bath for various times and the residual activity determined by the casein digestion method. The results are presented in FIGS. 14A, 14B, and 14C. These figures show that the proteases were complete inactivated at 60° C. after less than 2 minutes. More than 50% of the original activity was lost at 50° C. after 20 minutes but at 40° C. the activity decreased at a very slow rate.

The effect of various metal ions and other substances on the proteolytic activity of the proteases was studied by incubating the enzymes with the inhibitors for 15 minutes followed by the addition of the substrate (casein) and determining the activity. It was found that the proteases were unaffected or only slightly inhibited by barium, calcium, and magnesium ions even at relatively high concentrations. At low concentrations only the ions of heavy metals such as copper, nickel, cadmium, and iron had any inhibitory effect.

The results of studies with other substances are presented in Table 3.

Effect of some potential inhibitors on the activity of the purified proteases. The enzymes were preincubated with the inhibitor for 15 minutes before the assay. The caseinolytic activity was determined at pH 6.0.

TABLE 3

[Effect of some potential inhibitors on the activity of the purified proteases. The enzymes were preincubated with the inhibitor for 15 minutes before the assay. The caseinolytic activity was determined at pH 6.0.]

| Inhibitor | Final concentration of inhibitor | Proteolytic activity in percent of control | | |
|---|---|---|---|---|
| | | Protease I | Protease II | Protease III |
| Soybean inhibitor | 0.02% | 100 | 100 | 100 |
| ε-Amino caproic acid | $10^{-1}M$ | 100 | 100 | 100 |
| Potassium cyanide | $10^{-2}M$ | 100 | 95 | 93 |
| | $10^{-3}M$ | 100 | 100 | 100 |
| Iodine | $10^{-3}M$ | 50 | 0 | 0 |
| | $10^{-4}M$ | 97 | 82 | 35 |
| Iodo acetic acid | $10^{-2}M$ | 100 | 100 | 100 |
| | $10^{-3}M$ | 100 | 100 | 100 |
| Ascorbic acid | $10^{-2}M$ | 83 | 11 | 77 |
| Sodium lauryl sulfonate | $10^{-2}M$ | 13 | 100 | 34 |
| Laurylamine | $10^{-1}M$ | 27 | 26 | 0 |
| L-Cysteine | $10^{-2}M$ | 100 | 36 | 100 |
| | $10^{-3}M$ | 100 | 57 | 100 |
| Ethylenediamine tetra-acetic acid | $10^{-2}M$ | 100 | 10 | 100 |
| | $10^{-3}M$ | 100 | 11 | 100 |
| | $10^{-4}M$ | 100 | 15 | 100 |

Crystalline soybean trypsin inhibitor which is highly active against trypsin, did not show any effect on the proteases. Another potent trypsin and plasmin inhibitor, ε-amino caproic acid, was also without effect on all three proteases. Potassium cyanide and iodo acetic acid exerted little or no effect on the enzymes. Protease I and III were only slightly inhibited by ascorbic acid, which was, however, a powerful inhibitor of protease II. Conversely, protease I and III were strongly inhibited by sodium lauryl sulfonate and all three enzymes were inhibited by laurylamine. Ethylenediamine tetra-acetic acid and L-cysteine had a powerful inhibitory effect on protease II, but none on protease I and III. These results demonstrating some striking differences among these proteases.

Re-activation of inhibited enzyme by metal ions was also studied. Metal ions were added to a solution of protease II containing ethylene diamine tetra-acetic acid and the enzymatic activity was determined. Full recovery was observed in the case of $Zn^{++}$, $Mn^{++}$, $Co^{++}$, and $Fe^{+++}$ ions. Partial recovery was shown with $Cu^{++}$, $Ni^{++}$, and $Cd^{++}$ ions. The same results were obtained with an inhibited enzyme solution which had been dialyzed against distilled water.

The sera of most animals are known to contain powerful inhibitors of proteolytic enzymes. Such sera are also active inhibitors against the proteolytic enzymes of the present invention.

Serum inhibition of the proteases according to the present invention was determined by means of a simple fibrinolytic method. The enzyme in TRIS buffer solution of the pH of 7.4 and serum were mixed to give the desired amounts of each substance per 0.7 cc. of the mixture. After incubation for the desired period of time and at the respective temperature, 0.2 cc. of 2.50% human fibrinogen in TRIS buffer and 0.1 cc. of a thrombin solution (containing 100 NIH units per cc.) were added. The lysis time of the clot formed was estimated by incubation at 37° C. As end point of the lysis the time was taken when all air bubbles trapped in the meshwork of the clot rose to the surface. Control determinations were also carried out with solutions wherein the serum was replaced by bufffer solution. The amount of active enzyme could be estimated from a dose-response curve obtained by plotting enzyme concentration in C.U. against lysis time of a clot containing the same amount of fibrin as in the assay of inhibition. The units of protease inhibited by an aliquot part of serum were calculated from the difference between the proteolytic activity in the presence of buffer and the activity in the presence of serum. The inhibitory effect of normal human serum on the fibrinolytic activity of protease I, protease II, trypsin, and chymotrypsin was determined as follows. Varying amounts of the proteases were added to the same amount of serum and the decrease in proteolytic activity was determined. Examination of the shape of curves obtained by plotting enzyme concentration in C.U. against lysis time reveals remarkable differences in activity of the proteolytic enzymes in the presence of serum (FIG. 20.) In said FIG. 20 the curve lines show the lysis time for the following enzymes:

—o—o—o— Protease I
—△—△—△— Protease II
-.—o-.—o-.—o-.— Chymotrypsin
— —△— —△— —△— — Trypsin The lysis time for clots made from 0.50% of human fibrinogen and 0.2 cc. of human serum per cc. was determined at pH 7.4 and 37° C.

It is evident that the inhibitory effect of serum on trypsin and chymotrypsin is far greater than that on protease I and II. The amounts in C.U. of the different enzymes, which under the conditions used caused lysis of the clot in 20 minutes, were 1.1 units of protease I, 2.1 units of protease II, 3.2 units of chymotrypsin, and 4.3 units of trypsin. The extent of the digestion of casein by the proteases has also been investigated, as can be seen from FIG. 21. The caseinase activity was determined by the rate of hydrolysis of 1.5% casein at a pH of 7.4 at 37° C. for 30 minutes. The final volume of the reaction mixture was 6 cc. 1.0 C.U. of protease was used in each test. The protease activity was determined by measuring the increase in optical density of the trichloro acetic acid filtrate. The inhibitory effect of various amounts of serum was calculated in percent inhibition from the difference in activity of the enzyme inhibited by serum and the same amount of enzyme incubated with buffer solution, in place of serum. The curve lines indicate the same enzymes as in FIG. 20.

It is evident that trypsin and chymotrypsin are completely inhibited by a much smaller amount of serum than protease I and II. Protease I is under these conditions inhibited to a greater extent than protease II, but this is compensated by its higher fibrinolytic activity.

In preliminary experiments it was observed that the inhibition by serum varied with temperature. This dependence of the inhibition on temperature was further tested by incubation of serum and protease at different temperatures and determination of the residual activity. FIGS. 22A and 22B illustrate the inhibition after incubation for different times and at different temperatures, expressed in percent of the activity exhibited in the absence of serum. Protease I is used in FIG. 22A and protease II in FIG. 22B. 2.0 C.U. of the enzyme were used in each test. At zero time 0.2 cc. of human serum were added to each test and the residual activity was then determined.

The curves of FIG. 22A show a two-stage reaction. There is an immediate inhibition quantitatively independent of the temperature, followed by a slower but progressive inhibition, which proceeds over the entire period measured. The second reaction step is highly temperature dependent. No reaction takes place at 0° C. However, inhibition increases rapidly with rising temperature. On the basis of these experiments it appears to be possible that there are two inhibitory substances in human serum, which have different modes of inhibitory action on protease I. These substances shall be referred to hereinafter as "rapid" inhibitor and "slow" inhibitor.

The curves of FIG. 22B indicate that inhibition of protease II sets in almost immediately and is temperature dependent, but it is not possible to state whether one or several inhibitors are responsible for this effect.

The action of the "slow" inhibitor on protease I could be averted by the addition of substrate. Therefore, the inhibition of protease I shown in FIG. 20 is due to the action of the "rapid" inhibitor, while the same FIG. 20 shows total inhibition of protease II.

A linear relationship exists between the reciprocal of the lysis time and the concentration of protease I (FIG. 23A). The same type of linear curve was also obtained with protease II. This indicates the presence of an irreversible inhibitor of protease II in human serum. The first portions of enzyme added are inhibited, and only when enough of the enzyme is added to combine with the entire inhibitor, further amounts of enzyme will remain active. This relationship indicates also the presence of a second inhibitor of protease II, which combines reversibly with the enzyme, just as the "rapid" inhibitor of protease I. The inhibition of the enzymes can be calculated from the dose-response curves obtained without addition of serum. It has been found that about the same percentage of protease I was inhibited by a certain amount of serum independent of the concentration of enzyme used (FIG. 23B). This fact suggests also a reversible reaction between protease I and the "rapid" inhibitor. Likewise it could be demonstrated that the second inhibitor of protease II combines reversibly with the enzyme. Correction was made for the irreversible inhibition of protease II. The inhibition of said protease II by the reversible inhibitor is indicated by the curve line —△—.—△—. The experimental condition were the same as in FIG. 20.

Reversible inhibition by some of the serum components was also tested in another way. It could be shown that the actual inhibition was reduced with higher concentrations of substrate, indicating that the substrate competes with the inhibitor for the enzyme. The lysis time for clots containing varying amounts of fibrin and the same amount of serum and protease was determined. The curves in FIGS. 24A and 24B show inhibition of protease I by the "rapid" inhibitor and of protease II by the "second" inhibitor in the presence of varying amounts of fibrin. The curve lines in said FIGS. 24A and 24B indicate the following amounts of human fibrinogen from which the clots were made:

—△— — —△— — —△— 2.0% of human fibrinogen
—o-.—o-.—o— 1.0% of human fibrinogen
—△— —△— —△— 0.5% of human fibrinogen
—o—o—o— 0.25% of human fibrinogen 2.0 C.U. of the enzyme were used in each test and the inhibition by the indicated amounts of human serum was determined at a pH of 7.4 and 37° C. In the controls, the serum was replaced by buffer solution. The fact that inhibition of the enzymes by the same amount of serum was less when more substrate was present suggests competition between the serum components and the fibrin substrate for the active sites of the enzymes and supports the conclusion that the reactions are reversible.

FIG. 25 shows that the amount of protease II inhibited by the "first" inhibitor is directly proportional to the amount of serum present throughout the entire range of inhibition. The tests were carried out under the same conditions as used in FIG. 24B. The amount of enzyme inhibited by a definite amount of serum was independent from the concentration of fibrin used. The inhibition of protease II by the "first" inhibitor, therefore, appears to be an irreversible reaction.

The rate of inactivation of protease I by the "slow" inhibitor was determined at 37° C. with different amounts of serum. The results are shown in FIG. 26. The curves were obtained by incubating 2.0 C.U. of protease I at 37° C. with the following amounts of serum:

—o—o—o— 100 μl. of serum
—△—△—△— 200 μl. of serum
—o-.—o-.—o— 400 μl. of serum

The initial inhibition represents the effect of the "rapid" inhibitor. The difference between this initial inhibition and the remaining inhibition represents the progressive action of the "slow" inhibitor. It is apparent that the rate of inactivation by the "slow" inhibitor depends on the concentration of serum. When it is increased, the rate of inactivation is increased as indicated by the initial slopes of the curves. The evidence presented hereinabove regarding the existence of two types of inhibitors for protease I and II respectively were also confirmed by separation and estimation of two inhibitors for each enzyme. Human serum was fractionated by continuous flow paper electrophoresis, and each fraction separated was studied with respect to its level of antiproteolytic activity. Both the "rapid" and the "slow" inhibitor of protease I as well as the "first" and the "second" inhibitor of protease II were identified. The inhibitors of each enzyme were clearly separated and they were found in different fractions. Typical curves of protein separation and inhibitors of protease I, protease II and also trypsin and chymotrypsin are shown in FIG. 27E and FIGS. 27A, 27B, 27C, and 27D, respectively. The apparatus used was the Beckman/Spinco model CP. The separation of human serum was carried out in veronal buffer solutions of the pH of 8.5 and with an ionic strength of 0.025. The filter paper used was the Schleicher and Schull No. 2668, cut to provide 32 drippoints at the bottom of the curtain. The feed rate was about 0.2 cc. of serum per hour.

The protein concentration in the different fractions was determined by the modified biuret-Folin reaction described by Lowry et al. Aliquot portions of 0.1 cc. were used for the determination of the immediate and slow inhibitors which were carried out with 1 cc. of each fraction. FIG. 27E shows the distribution of the proteins after separation in veronal buffer solution of the pH of 8.5 and ionic strength 0.025. The current was 70 ma. and the temperature 20° C. FIGS. 27A, 27B, 27C, and 27D show the inhibitors of (A) protease I; (B) protease II; (C) trypsin; and (D) chymotrypsin. The inhibition could be estimated with either casein or fibrin as substrate, but the latter substrate gave the best results. The inhibition of 0.5 C.U. of the enzymes with 0.5 cc. of the different fractions was determined either directly (solid line) or after pre-incubation for 60 minutes (broken line).

In these experiments the alpha-1-globulins were not completely separated from the albumin but appeared as a shoulder on the anodal side of the albumin peak. The two types of inhibitors of protease I, however, were always unequivocally separated and some fractions contained only "rapid" inhibitor and others only "slow" inhibitor. It was found that the "rapid" inhibitor of protease I migrates with the alpha-2-globulins and the "slow" inhibitor with the alpha-1-globulins. The inhibitors of protease II were also clearly separated, and the "first" inhibitor was found among the alpha-1-globulins and the "second" inhibitor among the alpha-2-globulins. The inhibitors of trypsin and chymotrypsin were also studied and two inhibitors of each enzyme could be demonstrated. The major portion of the serum trypsin inhibitor migrated with the alpha-1-globulins, while a small amount migrated with the alpha-2-globulins. Both inhibitors combined rapidly with trypsin. Two inhibitors of chymotrypsin were also separated, one rapid inhibitor in the alpha-1-globulin fraction and a smaller amount of a slow inhibitor in the alpha-2-globulin fraction.

The amounts of inhibitors in the serum from various normal animals have also been determined. It was found that the levels of inhibitors varied within rather narrow limits in the serum of the same animal species. There were, however, great differences in amounts between the various animals, as can be seen from Table 4.

TABLE 4

[Inhibition of 2.0 C.U. of protease I and II by 0.2 cc. of serum was determined directly and, in the case of protease I, also after pre-incubation at 37° C. for 2 hours. The inhibition was calculated by determining the lysis times of clots made from 0.5% human fibrinogen and in a total volume of 1 cc.]

| Animal species | Percent inhibition | | |
|---|---|---|---|
| | Protease I | | Protease II |
| | Direct | After pre-incub. | Direct |
| Cat | 46 | 67 | 48 |
| Dog | 35 | 0 | 36 |
| Rabbit | 64 | 74 | 15 |
| Guinea-pig | 34 | 38 | 34 |
| Rat | 73 | 78 | 72 |
| Sheep | 51 | 70 | 82 |
| Pig | 66 | 78 | 66 |
| Horse | 76 | 80 | 62 |
| Ox | 50 | 79 | 66 |

As stated hereinabove, protease I and protease II have a noteworthy fibrinolytic activity at neutral pH-values. Their fibrinolytic activity was determined by means of three different methods.

(A) *Test tube method.*—This method was carried out as follows. 0.1 cc. of the enzyme to be tested was mixed with 0.1 cc. of a thrombin solution (containing 100 NIH units per cc. and 0.8 cc. of an 0.32 solution of human fibrinogen in TRIS buffer solution of a pH of 7.4 at 37° C.). The end point was taken when all bubbles trapped in the clot rapidly rose to the surface.

(B) *Opacity method.*—In this method the use of a spectrophotometer permits the determination not only of the end-point but also provides a continuous record of clot formation and clot lysis. (0.1 cc. of the enzyme to be tested was mixed with 0.1 cc. of a thrombin solution (containing 100 NIH units per cc.) and 3.0 cc. of an 0.5% solution of human fibrinogen in TRIS buffer of a pH of 7.4. Mixing was effected in a cuvette with a 10 mm. inner diameter and incubation was carried out at 25° C. The time from starting the test to attaining maximum opacity of the mixture was designated at the clotting time and the interval between the beginning of the decrease in opacity and the point of return of the curve to the abscissa as lysis time.)

(C) *Fibrin plate method.*—This method can be used for determining the fibrinolytic activity in combination with plasminogen activation or for solely determining fibrinolytic or proteolytic activity after denaturation of the plasminogen initially present in the fibrinogen.

(a) Unheated fibrin plates: Fibrin plates were prepared by the method of Astrup and Muellertz. Nine cc. of an 0.3% human fibrinogen solution in phosphate or TRIS buffer of a pH of 7.4 with the ionic strength of 0.15, was clotted with 1 cc. of thrombin solution (25 NIH units per cc.) in a 10 cm. diameter Petri dish. The tests were conducted by placing 0.025 cc. of the samples on the fibrin layer. Controls using only buffer solutions were prepared in a similar way. The plates were incubated at 37° C. for 24 hours and the results were noted. The area of the zones where dissolution occurred were taken as a measure of the fibrinolytic activity.

(b) Heated fibrin plates: Fibrin plates were prepared using the above described technique. After the fibrinogen was clotted and a firm fibrin layer was obtained, the plates were heated at 85° C. for 30 min. This procedure resulted in denaturation of the contaminating plasminogen and rendered the plates non-susceptible to the action of plasminogen activators, while also slightly changing their sensitivity to proteolysis. The tests were carried out as described above.

The fibrinogenolytic activity was determined, for instance, by incubation, at 25° C., of 0.5% of human fibrinogen in TRIS buffer solution of the pH of 7.4 containing 1.5 C.U. cc. of protease I or II. Residual clottable fibrinogen was indicated by adding aliquot portions of 0.5 cc. of the incubated fibrinogen solution to 0.1 cc. of a thrombin solution containing 50 NIH units per cc. The time at which no clot formed was taken as the time of fibrinogenolysis.

The products obtained by digestion of fibrinogen and fibrin by means of protease I and II which are soluble in trichloro acetic acid were determined as follows:

To one series of test tubes containing the protease mixed with TRIS buffer solution of the pH of 7.4 there was added a solution of human fibrinogen in the same buffer solution to a final concentration of 0.5%. The volume of the resulting mixture was 1 cc. Three cc. of a 10% solution of trichloro acetic acid were added to one tube immediately after mixing and to the remaining tubes after incubation for varying periods of time at 37° C. The resulting degradation of the fibrinogen was ascertained by quantitatively determining the digestion products by means of ultraviolet spectrophotometry after removal of the trichloro acetic acid precipitates by centrifuging. In another series of test tubes the fibrinogen was clotted by the addition of thrombin. Fibrin degradation was also ascertained by determining the increase in absorptive power of the trichloro acetic acid supernatant layer.

FIG. 15 shows the dose-response curve of protease I and protease II with respect to the lysis time for 0.25% of human fibrinogen at the pH of 7.4 and at 37° C. In this FIG. 15 curve line –⊙–⊙–⊙– represents the results with protease I and curve line –▲–▲–▲– those with protease II. It is evident that 1.25 C.U. of protease I are required to cause lysis of the clot within 10 minutes, while 3.35 C.U. of protease II are needed to produce the same effect. It follows that protease I shows a much higher fibrinolytic activity than protease II although the enzymes have about the same caseinolytic activity per unit of weight.

Lysis of clotted fibrinogen is caused either directly by proteolytic enzymes that are capable of splitting the fibrin molecule, or indirectly by activators of plasminogen that convert plasminogen in the substrate into plasmin, with subsequent splitting up of the fibrin. Both proteolytic enzymes and activators can be determined by the fibrin plate method. The fibrin used as substrate contains plasminogen as a contamination. This can, however, be denaturated by heat treatment without seriously interfering with the reactivity of the fibrin substrate. The plate method has a very high sensitvity and only very small amounts of the enzymes are necessary. The areas of the zones where dissolution took place were taken as a measure of the enzymatic activity. The results were plotted on double logarithmic paper with the logarithm of the concentration of the enzyme in percent of the stock solution as abscissa and the product of the diameters as ordinate (FIG. 16). The stock solutions contained 2.0 C.U. per cc. of protease I or, respectively, of protease II, and 0.025 cc. of said solutions were used in each test. The plates were incubated at 32° C. for 18 hours:

with protease I –o–o–o– and with protease II –△—△—△— on normal plates as well as with protease I –⊙–⊙–⊙– and with protease II –▲–▲–▲– on heated plates.

These tests showed that $8.5.10^{-3}$ C.U. of protease I and $50.10^{-3}$ C.U. of protease II are required to produce a zone of dissolution of 15 mm. diameter. This clearly demonstrates the higher fibrinolytic activity of protease I. An increase in the lysis on heated plates compared with the effect on normal fibrin plates could also be demonstrated with both protease I and II. The same results have been obtained when using other highly purified proteolytic enzymes without activating properties for plasminogen. The striking difference between normal and heated plates as shown in FIG. 16 can be explained by the well-known fact that denatured protein undergoes easier degradation through proteolytic enzymes than ordinary protein. The results show that none of the proteases is able to activate plasminogen. Studies of the effect of the enzymes on purified human plasminogen were also in accordance with these findings.

Determination of fibrinolysis by means of methods using subjective measurements, namely, visual observation of the disappearance of the clotted fibrin will give results varying from one laboratory to another. To overcome this problem, methods have been worked out in which the lytic activity is determined by the use of an instrument. A modification of this method was also used in studying the properties of protease I and II in comparison with those of trypsin.

A fibrin clot was prepared by polymerization of human fibrinogen by the action of thrombin. The resulting opacity was determined at 600 m$\mu$. The opacity rose rapidly to a maximum in a few minutes during clotting and then gradually decreased if a fibrinolytic agent was present. The maximum opacity depended on the concentration of fibrinogen and thrombin, on the molarity of the buffer, and on the pH-value. It has been recognized for a long time that there is a linear correlation between the fibrinogen concentration and the degree of opacity after clotting. Therefore the method could be used both for determining the fibrinogenolytic and fibrinolytic activity of an enzyme. Delay in the addition of thrombin to a mixture of fibrinogen and a protease resulted in a decrease in the maximum opacity of the clot depending on the fibrinogenolytic activity of the enzyme. The fibrinolytic activity of the enzyme could be calculated from the lysis time read as the interval between the beginning of opacity decrease and the point of return to the abscissa.

Typical results obtained with protease I and II are shown in FIGS. 17A and 17B. The tests were carried out at 25° C. to reduce the fibrinogenolytic activity to a measurable velocity. FIG. 17A shows clot lysis by protease I and FIG. 17B clot lysis by protease II. Thrombin was added after a delay of ——————— 0 minutes.
— — — — – 2.5 minutes.
-. -. -. -. -. -. - 5 minutes, and
- - - - - - - - - - - - - 7.5 minutes.

The incubation mixtures had a final concentration of 0.5% of human fibrinogen and 1.5 C.U., per cc., of protease I or, respectively, protease II. It is evident that an appreciable fibrinogenolytic activity of protease I was observed first after a delay of 7.5 minutes in the addition of thrombin to a fibrinogen-protease I mixture. In spite thereof the enzyme showed a strong fibrinolytic activity and the clot was lysed in less than 50 minutes. The lysis time determined for an amount of protease II showing the same caseinolytic activity as protease I was about 150 min. Thus protease II was not as active against fibrin. On the other hand the evidence presented indicates clearly that fibrinogen is proteolyzed much more rapidly by protease II than by protease I. Pre-incubation for 2.5 minutes before the addition of thrombin resulted in a substantial reduction of the fibrinogen content of the clot, and no clot was formed after pre-incubation for 5 minutes. It has also been established that trypsin attacks fibrinogen still more readily than it digests fibrin. The largest amount of this enzyme which could be added to fibrinogen without making it unclottable corresponded to a caseinolytic activity of 0.2 C.U. No lysis of the clot was observed even after incubation for several hours. It was also observed in these experiments that the clotting time of fibrinogen that had been pre-incubated with protease I or II was shorter than that of normal fibrinogen.

The fibrinogenolysis was also compared with the fibrinolysis by incubation of the proteases with human fibrinogen at 25° C. and the pH of the mixture of 7.4 and testing for residual clottable fibrinogen by adding small aliquot portions to thrombin solutions. The time at which no clot formed was taken as the fibrinogenolysis time. In another series the mixtures of proteases and fibrinogen were clotted and the lysis of the clots was observed at the same temperature. In these experiments it could also be established that protease I has a more pronounced fibrinolytic activity than protease II which attacks fibrinogen more rapidly (FIGS. 18A and 18B). FIG. 18A illustrates the time required to make 0.5% fibrinogen unclottable whereby different concentrations of protease I, protease II, and trypsin were used. The following lines indicate these enzymes:

–o—o—o– Protease I
–△—△—△— Protease II
–□—.—□—.—□— Trypsin.

FIG. 18B illustrates the lysis time for equivalent amounts of fibrinogen with

—◉—◉—◉– Protease I and
—▲—▲—▲– Protease II

It is evident from these curves that the time for clot lysis with protease I was about six times that necessary for making the same amount of fibrinogen unclottable after incubation with the proteolytic enzyme without addition of thrombin. Protease II, however, made fibrinogen unclottable 40 times more rapidly than the clotted fibrinogen was lysed. The effect of the proteases was compared with that of trypsin and this enzyme made fibrinogen immediately unclottable in concentrations above 0.1 C.U. per cc. of incubation mixture. No lysis at all could be observed on clots formed in the presence of such small concentrations of trypsin. The clot formation may fail to take place in these systems for reasons other than complete proteolysis of all available fibrinogen. For example, products of hydrolysis may interfere with the initial action of thrombin on the remaining fibrinogen or interfere with the polymerization of activated fibrin monomers. The addition of more fibrinogen resulted in all cases in rapid formation of a clot.

The appearance of trichloro acetic acid-soluble products was also measured in systems containing protease I or II mixed with fibrinogen or fibrin. The tubes were incubated at 37° C. and trichloro acetic acid was added after different times of incubation. The precipitates were removed and the ultraviolet absorption at 280 m$\mu$ of the supernatant liquid was determined. The data are presented in FIG. 19 for the zero to four hours period. The initial fibrinogen concentration was 0.5% and the pH of the mixture was 7.4. Fibrinogen and fibrin digestion are illustrated by the following curve lines:

(a) Fibrinogen digestion:

—o— — —o— — —o— Protease I
—△— — —△— — —△— Protease II (b) Fibrin digestion:

—◉—◉—◉— Protease I
—▲—.—▲—.—▲— Protease II

The arrows indicate complete lysis. It is interesting to note that there is substantially no difference in fibrin and fibrinogen digestion by protease I while a more rapid proteolysis of fibrin than of fibrinogen by protease II is evident.

These tests clearly show that protease I differs essentially from protease II and also from trypsin inasmuch as it has about the same fibrinolytic and fibrinogenolytic activity while protease II, like trypsin, attacks fibrinogen more readily than it digests fibrin. Furthermore, it was found that protease I has a considerably stronger fibrinolytic activity than protease II.

It has also been found that the lysis time of systems containing fibrinogen and protease I are independent from the point of time at which thrombin is added provided the addition of thrombin was followed by the formation of a rigid clot. In using opacity method it was observed that regardless of whether the delay in the addition of thrombin was 2.5 minutes or 10 minutes, the last traces of a visible clot disappeared at about the same time in all systems where fibrinogen and fibrin were incubated with protease I.

A comparison of the rates of release of trichloro acetic acid-soluble products during the reaction of fibrin with protease I and of fibrinogen with the same enzyme indicates that the rate of release from the fibrinogen system was substantially equal to that from the system containing fibrin. In contrast thereto, the differences in the amounts of such products released from the two substrates by incubation with protease II or trypsin indicate a much more rapid proteolysis of fibrinogen than of fibrin.

As stated hereinabove, and shown by the above given tests, the new enzymes and especially protease I have a remarkable fibrinolytic activity and thus can be used as therapeutic agents effective in preventing abnormal intravascular deposition of fibrin and also in causing re-opening of occluded vessels by completely or partly destroying already formed thrombi. True anticoagulant agents such as heparin can be used only to prevent formation of new clots, but the thrombi already formed are not destroyed and irreversible changes in blood vessels and tissues are the result thereof. Therefore, fibrinolysis in vivo is an important step in the treatment of thrombosis.

Products, such as plasmin and streptokinase, have given promising but sometimes contradictory results. None of these substances can be considered to meet all the requirements of an effective thrombolytic agent. Protease I, in contrast thereto, is a compound which has a strong proteolytic fibrinolytic as well as anticoagulant activity. Very good therapeutic results have been obtained with this compound given alone or in combination with one or both of the proteases II and III.

Protease I and II and also to some extent protease III are capable of rapidly dissolving fibrin clots of human or animal origin. Plasma clots are also lyzed, but in this case a distinct inhibitory effect of the serum is observed. Thus a larger amount of enzyme has to be used to get as rapid a dissolution of the clot as in the absence of serum.

Extensive experiments have been carried out especially with protease I and effective lysis of the clot and re-opening of the occluded vessels has been proved. By the use of different methods, such as venography, measuring the decrease in radioactivity of an $I^{131}$-fibrin clot, and also by direct visual inspection of the thrombotic vessel, lysis of fibrin clots has been observed. A large number of experiments with rabbits, cats, and dogs have been carried out. The results of experiments with cats are compiled in Table 5. In these tests protease I of an activity of 15 C.U. per mg. was dissolved in physiological saline solution to the desired strength. The test animals were cats of both sexes varying in weight from 1.8 kg. to 4.5 kg. Anesthesia was induced by intraperitoneal injection of 35 mg./kg. of sodium phenobarbital. Small supplementary doses were given when necessary. Cats surviving for more than six hours were given 500,000 units of penicillin G subcutaneously as well as glucose solution by the same route.

Unless otherwise stated clots were formed in the femoral or saphenous vein in a conventional way by the injection of 50 units of thrombin in 0.05 cc. of saline solution into a vein segment isolated between two artery clamps. All side branches were ligated except one which was cannulated with polyethene tubing (Clay-Adams PE or 50) for the injection of thrombin. The contents of the segment were thoroughly mixed with the injected thrombin and the side branch was ligated. Semi-constricting ligatures were placed proximal to the clot to prevent escape of unlysed clots. The distal artery clamp was removed thirty minutes after the injection of thrombin and the remaining clamp after an additional thirty minutes. The ability of protease I to dissolve pre-formed non-radioactive venous thrombi was determined by using conventional X-ray technique. One hour to two hours after clot formation 2 cc. to 3 cc. of the contrast medium ("Urografin" 45% Schering) was infused in the thrombosed vein at a site distal to the clot and venograms were taken. When permanency of the clot was established, enzyme therapy was started. Venograms were then taken at intervals for periods up to 48 hours. Controls identical in treatment except for the omission of enzyme therapy were included.

In these experiments the doses of protease I administered varied from 12.5 C.U. to 45 C.U. per kg. of body weight. The enzyme was given as a single injection within 5 minutes. The doses were purposely chosen to fall below the serum inhibitor level to avoid free fibrinolytic activity in blood, because such doses have proved to be fatal to the animal. In a number of cats 2 mg. of heparin per kg. were administered prior to protease I to avoid reformation of clot.

distribution of radioactivity within the clot which was formed by subsequent injection of thrombin.

The lysis of the radioactive clots was measured as the decrease in radioactivity over the clotted area. A 2 x 2 inch sodium iodide thallium activated crystal in a specially designed lead shield was used as detector. This was coupled either to a radiation rate meter (Nuclear-Chicago) and a recorder (Texas Recti-riter) or directly to a counter (Baird Atomic). The detector was left in place and continuous recordings were usually made for 4 hours following injection of protease I. In the experiments of 48 hours duration the closed incision was opened at approximately 24 hours and 48 hours and the level of radioactivity determined.

In these experiments with radioactive clots the amount of protease I given was usually 50 C.U. per kg.; in a few instances 35, 45, and 65 C.U. per kg. were administered. Unless otherwise indicated, single doses were injected within 5 minutes.

Table 6 shows the thrombolytic activity of protease I upon $I^{131}$-labelled fibrin clots on systemic administration.

TABLE 6

| Treatment | X hours after administration | Percent of clots showing a decrease in radioactivity of | | | |
|---|---|---|---|---|---|
| | | 0-25% | 26-50% | 51-75% | 76-100% |
| Controls | 6 | 100 | 0 | 0 | 0 |
| | 24 | 100 | 0 | 0 | 0 |
| | 48 | 100 | 0 | 0 | 0 |
| Protease I 50 C.U./kg | 6 | 71.4 | 14.3 | 14.3 | 0 |
| | 24 | 50.0 | 16.7 | 33.3 | 0 |
| | 48 | 0 | 40.0 | 40.0 | 20.0 |
| Protease I 50 C.U./kg.+heparin 2 mg./kg | 6 | 75.0 | 25.0 | 0 | 0 |
| | 24 | 50.0 | 25.0 | 25.0 | 0 |
| | 48 | 0 | 0 | 66.7 | 33.3 |

| Treatment | X hours after administration | Complete occlusion of vessel by clot | Clot decreased | | No clot |
|---|---|---|---|---|---|
| | | | Complete occlusion | Passage | |
| Controls | 3 | 100 | 0 | 0 | 0 |
| | 6 | 100 | 0 | 0 | 0 |
| | 48 | 100 | 0 | 0 | 0 |
| Protease I 15 C.U./mg | 3 | 72 | 14 | 14 | 0 |
| | 6 | 33 | 17 | 50 | 0 |
| | 48 | 0 | 0 | 50 | 50 |

Other tests were carried out by using radioactive fibrinogen prepared according to Ambrus et al. using bovine fibrinogen as starting material. As a final step the labelled product was precipitated with acetate buffer solution of the pH of 5.4 and kept in a refrigerator at 4° C. The precipitate was dissolved in distilled water adjusted to pH 7.4 with sodium hydroxide. The clottability was routinely tested before use. 0.05 cc. of the $I^{131}$-labelled fibrinogen was injected via a cannulated side branch into the isolated vein segment and the contents of the segment were withdrawn twice to assure uniform Table 7 illustrates complete lysis of radioactive clots by treatment with protease I.

TABLE 7

| Treatment | Percent lysis of clots | | | | | |
|---|---|---|---|---|---|---|
| | Up to 6 hours | | Up to 24 hours | | Up to 48 hours | |
| | No. of clots | Mean percent lysis | No. of clots | Mean percent lysis | No. of clots | Mean percent lysis |
| Controls | 4 | 3.5 | 3 | 10.0 | 2 | 15.0 |
| Protease I 50 C.U./kg | 7 | 25.0 | 6 | 37.0 | 5 | 58.0 |
| Protease I 50 C.U./kg.+heparin 2 mg./kg | 3 | 17.0 | 4 | 41.0 | 3 | 69.0 |

The results of these experiments indicate that protease I possesses in vivo thrombolytic activity with intravenous doses that do not result in free fibrinolytic activity in the blood. When administered close to the clot, however, the enzyme is probably in excess of inhibitors which explains the rapid lysis observed in these cases amounting to approximately 50 percent in two hours with a dose of 10 C.U. per kg. With systemic enzyme therapy the effect of protease I was more variable with a mean lysis of 25 percent in 6 hours. Pre-treatment with heparin seems to produce a higher percentual lysis.

FIGS. 28A, 28B, and 28C represent segments of Texas recordings indicating the thrombolytic activity of protease I upon radioactive clots. FIG. 28B shows that, when protease I is injected locally, i.e., in close proximity to the clot in amounts of 25 C.U./kg., a fairly rapid decrease in radioactivity of the clotted area is achieved. FIG. 28C shows a similar decrease in radioactivity when 40 C.U./kg. of protease I were administered systemically by injection in two doses at zero hour and after 1 hour while FIG. 28A illustrates control tests.

In order to gather information on the mechanism by which protease I interacts with the inhibitors present in the serum, experiments were carried out regarding the distribution and fate of intravenously administered protease I. For this purpose, the enzyme was labelled with $I^{131}$ and was injected into cats in which venous clots were preformed.

The labelled protease I was prepared by dissolving highly purified preparations of protease I in 0.1 M borate buffer solution of the pH of 8.5. The enzyme was mixed with the iodinating reagent (Ambrus) containing 2–5 mc. of carrier-free $NaI^{-131}$. The reaction mixture was dialyzed over night and subsequently passed through a Sephadex G–75 column. FIG. 29 illustrated the purifying effect of such a treatment. The curve line –⊙—⊙—⊙— indicates the ultraviolet absorption at 280 mμ, the curve line –▲–.–▲–.–▲– the caseinase activity determined at a pH of 7.4, and the curve line –o– –o– –o– the radioactivity measured by means of a well type scintillation counter. Fractions of 5 cc. each were collected at a flow rate of 30 cc. per hour. Only the fractions containing protease I as indicated by their ultraviolet absorption and their caseinolytic activity were used for the following in vivo experiments. 1–2 μC./kg. of the labelled protease I was injected intravenously into cats. Filtration through Sephadex eliminates the presence of labelled products other than protease I.

FIG. 29 clearly shows that the data for radioactivity, ultraviolet absorption, and caseinolytic activity are in full agreement.

FIG. 30 and FIG. 31 illustrate the rate of blood clearance of protease I and its localization in the clots. 15 C.U. of protease I, i.e. 1.2 μc. per kg. in the cat of FIG. 30, 1.3 μc. per kg. in the cat of FIG. 31 were injected. The horizontal bars denote the time during which the respective clots were exposed to the circulating enzyme. The radioactivity values are expressed in percent of the injected dose per 100 g. of clot. The lytic action was calculated on the basis of change in weight of the clots.

It is evident from these FIGS. 30 and 31 that appreciable amounts of radioactivity persist in the circulation for a rather long time after the injection of labelled protease although the main part is cleared quite rapidly. Free fibrinolytic activity in the blood could not be demonstrated at any time during this test. On analyzing the curves, at least two types of processes are encountered, a fast one with a half-life of approximately 25 minutes and a slow one with a more variable half-life ranging from 150–300 minutes. About 70–80 percent of the injected radioactivity was cleared within 25 minutes. When small doses of labelled enzyme were given the proportion cleared by the fast process tended to be higher than with large doses. The blood clearance curves of protease I differ somewhat from those of plasmin mainly with respect to the biological half-life of the fast process, which in the case of protease I was 25 minutes, compared to 4 minutes for plasmin.

The radioactivity that has been found to circulate in the blood for appreciable time periods after the injection of labelled protease I is assumed to represent protease I complexed with the reversible inhibitor of the cat serum.

These radioactivity data also permit to draw the conclusion that a certain amount of the injected enzyme was adsorbed onto pre-existing clots. When the results are expressed as percent of the injected activity contained in 100 g. of clot, values ranging from 0.35 to 4.2 percent with a mean value of 1.7 percent were obtained. The clots removed three hours after enzyme administration showed the highest amount of radioactivity whether or not they had been exposed to the circulating blood for three hours or only between the second and the third hour. This rules out the possibility that the radioactivity found in the clots was due to contamination with blood. The conclusion that the radioactivity of the clots actually represents adsorbed protease I is given further support by the results obtained when incubating the clots. The percent lysis observed at 72 hours roughly parallels the amount of radioactivity entrapped in the clots.

Localization of the enzyme in the clots may be due to an exchange of the reversible inhibitor of the cat serum with which the protease I is complexed, by the clotted fibrin to which protease I has a high affinity.

Tests were carried out to find out about the tissue distribution of labelled protease I 4 hours after its injection. For this purpose the test animals were killed at the end of the experiment and were exsanguinated. The amount of radioactivity in the following tissues were determined in a well-type scintillation counter: Liver, spleen, lungs, kidneys, heart, thyroid gland, stomach, and urine. The results are given in the following Table 8.

TABLE 8

| Tissue | Weight g. | Total c.p.m. | C.p.m. per g. | Percent |
| --- | --- | --- | --- | --- |
| Liver | 105 | 59,885 | 570 | 7.0 |
| Spleen | 21 | 5,090 | 463 | 0.6 |
| Kidney | 31 | 20,073 | 648 | 2.3 |
| Stomach | 27.5 | 35,805 | 1,302 | 4.2 |
| Heart | 13.5 | 2,727 | 202 | 0.3 |
| Lungs | 22.5 | 11,590 | 515 | 1.3 |
| Thyroid | 0.5 | 5,330 | 10,660 | 0.6 |
| Urine | 52 | 284,856 | 5,478 | 33.0 |

The highest specific activity was shown by the thyroid, the urine, and the stomach. Obviously protease I is to a large part excreted by the kidneys as the urine contained some 25–35 percent of the injected activity within a four hour period.

Intravenously administered protease I thus seems to be metabolized by the organism. The radioactivity encountered in the thyroid, the stomach, and the urine is presumably due to break-down products, though as yet no experimental proof exists therefor.

As has been shown hereinabove, the fibrinolytic activity of protease I alone or in combination with protease II was greatly enhanced by simultaneous administration of 2 mg./kg. of heparin. Heparin acts not only as an anticoagulant, but another still unknown mechanism seems to take place. In therapy, it is advisable to administer the proteases together with heparin, provided there are no contraindications against the use of heparin.

Protease I and combinations, protease II and/or protease III do not exert their fibrinolytic activity via the plasminogen-plasmin system. Therefore, their use represents a great advantage over the administration of agents such as plasmin, streptokinase, and urokinase (plasminogen activator isolated from urine). Streptokinase and urokinase act indirectly by converting plasminogen into plasmin. The clot dissolution is the result of the lyzing action of plasmin, formed from the plasminogen directly adsorbed by fibrin. The plasmin circulating in the blood has no or only an insignificant clot lyzing effect. After a prolonged treatment with a plasminogen activator all of the plasminogen has been converted into plasmin which is inactivated by serum inhibitors. A clot formed during such a treatment does not contain plasminogen and, therefore, cannot effectively be attacked by the administration of plasminogen activator. This has been recognized as a great problem in fibrinolysis and is a serious complication of such a treatment. However, when using protease I alone or in combination with protease II and/or III, such complications are avoided and a plasminogen-free clot is also dissolved by said proteases. These enzymes do not activate the plasminogen-plasmin system. Protease I, II, and III are inhibited by serum but to a much smaller extent than plasmin, trypsin, and other proteolytic enzymes. This property is also of great advantage in the use of these enzymes as thrombolytic agents.

The amounts of the proteases which, according to the invention, have to be administered to achieve satisfactory results depend on the concentration of serum inhibitor in the person or animal to be treated. The concentration of the serum inhibitor is determined by analysis of the serum. The enzymes must carefully be administered intravenously. Proteolytic activity in the blood stream for a prolonged period of time may cause decomposition of various blood components and may lead to serious disturbances. (This is also true for the treatment with plasmin and streptokinase.) Therefore, the proteases must be given in small amounts, but they are still highly active even in small concentration in the blood, probably because they circulate in the blood in the form of a reversible complex with a blood protein, which complex can be split up whereupon the released enzymes are bound to fibrin molecules to which they have a greater affinity.

About 2 mg. to 4 mg. of protease I or a combination containing the same amount of protease II and 2 mg. of heparin, all calculated per kg. of body weight, are administered. This dose is fully satisfactory in most cases. No decrease in blood pressure is noted and only a slight increase in body temperature has been observed. This increase in body temperature is not due to the presence of pyrogens in the used preparations but is a side effect of the thrombolytic enzyme activity.

Protease I alone or in combination with protease II shows in vivo not only a fibrinolytic effect but also a pronounced antithrombin activity. Plasmin and trypsin, in contrast thereto, accelerate formation of thrombin from prothrombin when larger doses are given. This effect results in a continuous coagulation of fibrin so that the treatment with these two substances is questionable.

Protease I or a combination with protease II and/or III have also been proved to be extremely useful in the treatment of various types of wounds. Dead tissue is rapidly digested by the enzymes without any damage to living tissue or other undesirable side-effects. Enzymes such as streptokinase in combination with streptodornase ("Varidase"), trypsin, and other proteolytic enzymes have previously been used for this purpose. The effect of "Varidase" is dependent upon the presence of plasminogen, which is activated and converted into plasmin. Therefore, as explained above, this enzyme preparation has a very limited utility. Trypsin and plasmin are strongly inhibited by serum and their effect is rather small. Furthermore, fresh enzyme has to be administered repeatedly within short intervals of time to produce any effect at all. Trypsin is also very unstable in solution, even if stabilized by the addition of calcium salts. Due thereto, the use of aqueous solutions of trypsin in the treatment of wounds is possible only with great difficulties.

Protease I or a mixture of proteases I, II, and/or III are very stable in solutions as well as in ointments. A solution of said enzymes can be kept at room temperature for many days without any loss of activity. In powder form or in the form of ointments containing buffering substances which in contact with the body fluids will keep the pH-value at the pH of optimum activity, the proteases I, II, and III are stable for a considerable period of time. Said proteases rapidly decompose clotted blood, exudates, and necrotic tissues. They are, however, inactive against native tissue, which is a basic requirement for their usefulness in wound treatment.

The proteases according to the present invention have a very good effect on purulent or necrotic processes, for instance, they are highly useful in the treatment of ulcus cruris varicosum, diabetic and arteriosclerotic gangrene, decubitus sores, abscesses, empyemas, and the like.

In the treatment of highly infected wounds it is desirable to combine this treatment with local antibiotic therapy. The proteases I, II, and III can be combined with various antibiotics such as natural and semisynthetic penicillins, tetracycline, tyrothricin, kanamycin, neomycin, bacitracin, polymyxin, trichomycin, xanthocillin, and others and their salts without any substantial reduction in their proteolytic activity. The combined enzyme-antibiotic therapy has proved to produce very good results.

The proteases I, II, and III have also a typical anti-inflammatory activity, which has a favorable effect when administering the same.

Tests to show the debriding effect of protease I, protease II, trypsin, and chymotrypsin were carried out whereby the enzymes were dissolved in phosphate buffer solution of a pH of 7.4 and an ionic strength of 0.1 to give the same proteolytic activity per cc. Comparisons were made at four activity levels namely with 6.0, 3.0, 1.5, and 0.75 caseinolytic units (C.U.) per cc. When used as ointments the proteolytic enzymes were thoroughly mixed with an ointment base consisting of the dilaurates and distearates of polyethylene glycol and glycowax. Here again the enzymes were compared at the same activity level.

Stability measurements in both media showed that in solution protease I and II were stable for days at 0° C. and for more than half a year in ointments.

A preparation of streptokinase-streptodornase (Varidase, Lederle) was also used in some experiments.

Guinea-pigs of both sexes weighing 300–500 g. were used in these tests. Both dorso-lateral sides were clipped as closely as possible. The animals were anesthetized with urethane (1 g./kg.) and four third-degree burns were produced on their backs with a hot (300–400° C.) soldering iron which was applied under gentle pressure for 15 seconds. The area of the tip of the soldering iron was 11 x 8 mm.

The enxymes were applied either as solutions or in the form of ointments. The burns were covered with gauze compresses and unventilated adhesive plasters, the edges of which were carefully sealed with rubber cement. Preliminary experiments assured that under these conditions no leakage occurred. 0.4 cc. of the enzyme solutions were injected beneath the plaster of each burn with a hypodermic needle. Controls were treated with the same amount of buffer solution. 250 mg. of enzyme ointment were applied to each burn. Each enzyme was aministered to the two burned sites of the same side of the animal. Enough animals were used to allow comparisons to be made between the four enzymes and controls.

20–22 hours after enzyme application the animals were anesthetized and the bandages removed. The degree of debridement caused by the enzymes was determind according to a biological scale.

FIG. 32 represents a summary of the results obtained in these debridement tests. In this figure P I indicates protease I, P II protease II, T trypsin, and Ch chymotrypsin. The dose-response curves for trypsin and chymotrypsin show a pronounced inclination at approximately 40 percent debridement. Further increases in the doses of these two enzymes seemed to be of little value. Protease I and II on the other hand accomplished a higher degree of debridement, the inclination point occurring at a significantly higher level.

A possible explanation of this difference may be found in the difference in behavior of the respective enzymes towards inhibitors present in the guinea-pig serum (FIG. 33A and FIG. 33B).

FIG. 33A illustrates the clot lysing effect by the enzymes in the presence of guinea pig serum whereby the curve lines indicate the following curves:

—⊙—⊙—⊙—⊙—⊙— Protease I
—▲—▲—▲—▲—▲— Protease II
—O—O—O—O—O— Chymotrypsin
—△—△—△—△—△— Trypsin The clots were produced from 0.5% human fibrinogen solutions and 0.2 cc. of guinea pig serum per cc. were added. Lysis was effected at 37° C. and a pH of 7.4.

FIG. 33B illustrates the inhibition of casein digestion by said enzymes in the presence of various amounts of guinea pig serum. The caseinase activity was determined by the rate of hydrolysis of 1.5% casein at a pH of 7.4 after incubation at 37° C. for 30 minutes. The final volume of the reaction mixture was 6 cc. and 1.0 C.U. of each protease was used in all tests. The increase in optical density of the trichloro acetic acid filtrate was used as a measure of protease activity. Percent inhibition was calculated from the difference in activity between the inhibited enzyme and the same amount of enzyme incubated with buffer solution alone, i.e. in the absence of serum.

It is evident that the activity of trypsin and chymotrypsin is far more readily inhibited than that of protease I and II.

The appearance of the burns at different degrees of debridement make it unlikely that the influence of serum on topically applied enzymes is of any importance until some 30–40 percent of the devitalized tissue have been degraded. However, once the serum inhibitors can exert their action, trypsin and chymotrypsin are more or less immediately inhibited. As protease I and II are not inhibited to the same extent, their debriding activity consequently remains higher.

The new proteases according to the present invention thus are characterized by the following properties:

*Properties common to all three proteases*

They are protein-like compounds of uniform composition as proved by electrophoresis with the use of acetate, phosphate, veronal, and phosphate-borate buffer solutions.

They are readily soluble in water and buffer solutions.

They are precipitated from their solutions by the addition of tannic acid.

In dry powder form they are stable and retain their proteolytic activity at room temperature for more than a year.

Their ultraviolet absorption spectra show that their main absorption bands occur in the region characteristically associated with proteins and aromatic acids.

Their infrared spectra correspond to those of proteins and other proteolytic enzymes.

They are proteolytically effective and cause digestion of gelatin and hemoglobin.

They do not significantly hydrolyze lysine ethyl ester.

They are completely inactivated at 60° C. within less than 2 minutes; more than 50% of their initial activity was lost at 50° C. within 20 minutes, while the activity decreased only very slowly at 40° C.

Their activity is not at all or only slightly affected by barium, calcium, and magnesium ions. Only heavy metal ions such as copper, nickel, cadmium, and iron ions have an inhibitory effect in low concentrations.

Soybean inhibitor, ε-amino caproic acid, potassium cyanide, iodo acetic acid have no or only an insignificant activity inhibiting effect.

In addition thereto the proteases I, II, and III possess the following properties and differ from each other as is evident from Table 9:

TABLE 9

| No. | Property | Protease I | Protease II | Protease III |
|---|---|---|---|---|
| 1 | pH of optimum activity: | | | |
|  | Casein | 8.2(7.6–9.5) | 6.8(6.3–6.8) | 4.5. |
|  | Gelatin | 9.0–9.5 | 6.3 | 4.3. |
|  | Hemoglobin | 7.6 | 6.8 |  |
|  | TAME | 8.5 |  |  |
| 2 | Optimum proteolytic temperature | 50° C | 50° C | 45° C. |
| 3 | Stable at 37° C. for 30 min. at pH of | 5.0–8.5 | 4.5–10.5 | 3.0–6.3. |
| 4 | Inhibition by: | | | |
|  | Iodine | No | Slight | Strong. |
|  | Ascorbic acid | Slight | Very strong | Slight. |
|  | Na lauryl sulfonate | Very strong | No | Strong. |
|  | Laurylamine | Strong | Strong | Completely inactivated. |
|  | L-cysteine | No | Strong | No. |
|  | Ethylene diamine tetra-acetic acid | No | Very strong | No. |
|  | Human serum | More than protease II | Less than protease I |  |
| 5 | Activity: | | | |
|  | Fibrinolytic | 3–6x as effective as protease II | ⅓–⅙ as effective as protease I |  |
|  | Fibrinogenolytic | Considerably less effective than protease II; no difference in fibrinolytic and fibrinogenolytic activity. | More effective than protease I. |  |
|  | Caseinolytic | Like that of protease II | Like that of protease I |  |
| 6 | Adsorption by ion exchange agents: | | | |
|  | On carboxy methyl cellulose (0.7–0.9 milli-equivalents/g.) from 0.01 M phosphate buffer. | At pH of 5.5 | At pH of 4.5 | At pH of 3.0. |
|  | Elution therefrom by 0.05 M phosphate buffer. | At pH above 6.0 preferably at pH of 7.0. | At pH of 6.5–7.0 | At pH of 6.0. |
| 7 | Molecular weight | 36.000 |  | 95.000. |
| 8 | Sedimentation constant |  | 3.3 Svedberg units (Determined at pH=6.8 in 0.1 M phosphate buffer made 0.1 M with respect to NaCl). |  |

The following examples illustrate preparations as they are used in therapy without, however, being limited thereto.

EXAMPLE 5

*Solution of protease I for intravenous injection*

Protease I _____ mg__ 50
Saline solution _____ cc__ 50

Protease I is dissolved in said saline solution shortly before use to give an injectable solution containing 1 mg. of protease I per cc.

EXAMPLE 6

*Solution of protease I and protease II for intravenous injection*

Protease I _____ mg__ 25
Protease II _____ mg__ 25
Saline solution _____ cc__ 50

Protease I and II are dissolved in said saline solution shortly before use to give an injectable solution containing 0.5 mg. of protease I and 0.5 mg. of protease II.

EXAMPLE 7

*Solution of protease I and heparin for intravenous injection*

| | |
|---|---|
| Protease I _____ mg__ | 25 |
| Heparin _____ mg__ | 25 |
| Saline solution _____ cc__ | 50 |

Protease and heparin are dissolved shortly before use. One cc. of solution contains 0.5 mg. of protease I and 0.5 mg. of heparin.

EXAMPLE 8

*Ointment for debriding burns*

Protease I.
Protease II.

| Ointment base: | Percent |
|---|---|
| Polyethylene glycol dilaurate | 60 |
| Polyethylene glycol distearate | 10 |
| Glycowax | 15 |
| Vaselin | 5 |
| Paraffin | 10 |

The proteases were thoroughly mixed with the ointment base. 1 g. thereof contains 1–4 mg. of protease I and 1–4 mg. of protease II.

The proteases may also be used in pulverulent anhydrous preparations for the treatment of purulent and necrotic wounds.

Of course, the new proteases according to the present invention may be obtained not only by cultivating *Aspergillus oryzae*, but also other Aspergillus species such as *Aspergillus flavus,* or other molds such as molds of the genus Absidia, such as *Absidia cocrulea,* and others provided these molds yield proteases having fibrinolytic and fibrinogenolytic properties.

I claim:

1. A process of selectively isolating and separating proteolytic enzymes, said process comprising the steps of
    (a) contacting a solution of the proteases with an ion exchange agent selected from the group consisting of carboxyl methyl cellulose and a carboxy methyl cross-linked dextran at a pH between about 2.5 and about 8.5 and
    (b) eluting the adsorbed proteases from said ion exchange agent by passing therethrough an eluting solution buffered to a pH-value higher than that at which the respective proteases were adsorbed.

2. A process of selectively isolating and separating proteolytic enzymes produced by cultivation of molds, said process comprising the steps of
    (a) contacting a solution of mold proteases with an ion exchange selected from the group consisting of carboxy methyl cellulose and a carboxy methyl cross-linked dextran at a pH between about 2.5 and about 8.5 and
    (b) eluting the adsorbed proteases from said ion exchange agent by passing therethrough an eluting solution buffered to a pH-value higher than that at which the respective proteases were adsorbed.

3. A process of selectively isolating and separating proteolytic enzymes, said process comprising the steps of
    (a) contacting a solution of proteases obtained on cultivating *Aspergillus oryzae*, with a cation exchange agent selected from the group consisting of carboxy methyl cellulose and a carboxy methyl cross-linked dextran at a pH between about 2.5 and about 5.5 and
    (b) eluting the adsorbed enzymes from said cation exchange agent at a pH between about 6.0 and about 7.5, 4. The process according to claim 3, wherein adsorption is carried out on a carboxy methyl cellulose containing 0.7 to 0.9 milli-equivalents of carboxyl groups per g.

5. A process of selectively isolating and separating proteolytic enzymes, said process comprising the steps of
    (a) contacting proteases produced by cultivation of *Aspergillus oryzae* and subsequently purified by precipitation by means of tannin, with a cation exchange carboxyl methyl cellulose at a pH between about 2.5 and about 5.5 and
    (b) eluting the adsorbed proteases from said ion exchange agent by passing therethrough a buffer solution adjusted to a pH between about 6.0 and about 7.5.

6. The process according to claim 5 wherein adsorption is carried out on a carboxy methyl cellulose containing 0.7 to 0.9 milli-equivalents of carboxyl groups per g.

7. A process of selectively separating and isolating protease I, protease II, and protease III from solutions containing at least one of said enzymes together with accompanying proteinaceous impurities, said process comprising the steps of
    (a) adjusting the protease-containing solution to a pH of about 5.5,
    (b) contacting said solution with a cation exchange carboxy methyl cellulose adjusted to the same pH of about 5.5,
    (c) separating the carboxy methyl cellulose together with the protease I adsorbed thereon from the solution,
    (d) adjusting the protease I-free solution to a pH of about 4.5,
    (e) contacting said solution with a cation exchange carboxy methyl cellulose adjusted to the same pH of about 4.5,
    (f) separating the carboxy methyl cellulose together with the protease II adsorbed thereon from the solution,
    (g) adjusting the resulting protease II-free solution to a pH of about 3.0,
    (h) contacting said solution with a cation exchange carboxy methyl cellulose adjusted to the same pH of about 3.0,
    (i) separating the carboxy methyl cellulose together with the protease III adsorbed thereon from the solution, and
    (j) eluting the adsorbed proteases I, II, and III separately from said cation exchange agents by washing each of said agents with buffer solutions of pH-values higher than those at which the respective proteases were adsorbed.

8. A process of selectively separating and isolating protease I, protease II, and protease III from solutions containing said enzymes together with accompanying proteinaceous impurities, said process comprising the steps of
    (a) filtering a culture medium obtained by submerged cultivation of *Aspergillus oryzae* until sporulation sets in,
    (b) precipitating proteinaceous compounds of the filtered culture liquid containing the proteases by the addition of tannin,
    (c) removing the tannin from the precipitate by treatment with acetone,
    (d) dissolving the remaining proteins in an aqueous solvent of a pH of about 5.5,
    (e) contacting the protease-containing solution with a cation exchange agent selected from the group consisting of carboxy methyl cellulose and a carboxy methyl cross-linked dextran adjusted to the same pH of about 5.5,
    (f) separating the cation exchange agent together with protease I adsorbed thereon from the solution,
    (g) adjusting the pH-value of the solution to a pH of about 4.5, (h) contacting the adjusted solution with a cation exchange agent selected from the group consisting of carboxy methyl cellulose and a carboxy methyl cross-linked dextran adjusted to the same pH of about 4.5,
(i) separating the ion exchange agent together with protease II adsorbed thereon from the solution,
(j) adjusting the pH-value of the solution to a pH of about 3.0,
(k) contacting the adjusted solution with a cation exchange agent selected from the group consisting of carboxy methyl cellulose and a carboxy methyl cross-linked dextran adjusted to the same pH of about 3.0,
(l) separating the cation exchange agent together with protease III adsorbed thereon from the solution, and
(m) eluting the adsorbed proteases I, II, and III separately from said cation exchange agents by washing each of said agents with buffer solutions of pH-value higher than those at which the respective proteases were adsorbed.

9. The process according to claim 8, wherein adsorption is carried out on a carboxy methyl cellulose containing 0.7 to 0.9 milli-equivalents of carboxyl groups per g.

10. The process according to claim 8, wherein the pH-value of the solution, before adsorption, is adjusted to the required pH by the addition of an 0.01 molar phosphate buffer solution.

11. The process according to claim 8, wherein elution of the cation exchange agent is effected by means of an 0.05 molar phosphate buffer solution.

12. A process of purifying proteases selected from the group consisting of protease I, protease II, and protease III, said process comprising the steps of
(a) adjusting the pH-value of a solution containing at least one of said proteases together with accompanying impurities to a pH of about 5.5,
(b) contacting said adjusted solution with a cation exchange carboxy methyl cellulose adjusted to the same pH of about 5.5,
(c) separating the carboxy methyl cellulose together with protease I adsorbed thereon from the solution,
(d) adjusting the remaining solution to a pH of about 4.5,
(e) contacting said adjusted solution with carboxy methyl cellulose adjusted to the same pH of about 4.5,
(f) separating the carboxy methyl cellulose together with protease II adsorbed thereon from the solution,
(g) adjusting the remaining solution to a pH of about 3.0,
(h) contacting the adjusted solution with carboxy methyl cellulose adjusted to the same pH of about 3.0,
(i) separating the carboxy methyl cellulose together with protease III adsorbed thereon from the solution,
(j) eluting the adsorbed proteases I, II, and III separately from each cation exchange carboxy methyl cellulose by washing with buffer solutions of pH-values higher than those at which the respective proteases were adsorbed, and
(k) further purifying the resulting separated proteases I, II, and III by ion exchange chromatography on an anion exchange agent selected from the group consisting of ethyl cellulose and a diethylamino ethyl ether of a cross-linked dextran.

13. The process according to claim 12, wherein proteases produced on cultivation of *Aspergillus oryzae* and prepurified by tannin precipitation are used as starting material.

14. The process according to claim 12, wherein further purification of protease I obtained by eluting it from an adsorbate on carboxy methyl cellulose is effected by ion exchange cromatography on diethylamino ethyl cellulose, thereby using an 0.05 molar phosphate buffer solution as eluting solvent.

15. The process according to claim 12, wherein further purification of protease II, obtained by eluting it from an adsorbate on carboxy methyl cellulose, is effected by ion exchange chromatography at a pH of about 6.0 on diethylamino ethyl cellulose, thereby using an 0.05 molar phosphate buffer solution as eluting solvent.

16. The process according to claim 12, wherein further purification of protease III obtained by eluting it from an adsorbate on carboxy methyl cellulose is effected by ion exchange chromatography at a pH of about 6.0 on diethylamino ethyl cellulose, thereby using an 0.05 molar phosphate buffer solution as eluting solvent.

17. The process according to claim 8, wherein the proteases eluted from their carboxy methyl cellulose adsorbates are isolated by precipitation with tannin.

18. The process according to claim 8, wherein the proteases eluted from their carboxy methyl cellulose adsorbates are isolated by dialysis and freeze drying.

19. The process according to claim 12, wherein an anion exchange agent having a total ion exchange capacity of 0.4 to 0.6 milli-equivalents per g. is used for further purification.

References Cited by the Examiner

UNITED STATES PATENTS

| | | | |
|---|---|---|---|
| 2,762,749 | 9/1956 | Myers et al. | 195—67 |
| 2,888,385 | 5/1959 | Grandel | 195—67 |
| 2,927,060 | 3/1960 | Oringer | 195—66 |
| 2,952,586 | 9/1960 | Okunuki et al. | 195—66 |
| 3,003,917 | 10/1961 | Beiler et al. | 167—73 |
| 3,036,960 | 5/1962 | Lallouette | 195—66 |
| 3,063,911 | 11/1962 | Tanaka et al. | 195—62 |
| 3,072,532 | 1/1963 | Innerfield | 167—73 |
| 3,140,984 | 7/1964 | Tosoni et al. | 195—66 |

OTHER REFERENCES

Crewther et al.: Australian Journal of Biological Sciences, 1953, vol. 6, pp. 410–462.

Flodin et al.: Nature, Nov. 5, 1960, vol. 188, pp. 493–494.

Horace et al.: Proceedings Society Experimental Biology and Medicine, 1959, vol. 102, pp. 201–203.

Porath et al.: Nature, July 1, 1961, vol. 191, pp. 69–70.

A. LOUIS MONACELL, *Primary Examiner.*

FRANK CACCIAPAGLIA, JR., E. FRANK,
L. M. SHAPIRO, *Assistant Examiners.*